United States Patent
Shimotsu et al.

(10) Patent No.: US 12,192,602 B2
(45) Date of Patent: Jan. 7, 2025

(54) IMAGING CONTROL DEVICE, OPERATION METHOD AND PROGRAM OF IMAGING CONTROL DEVICE, AND IMAGING DEVICE

(71) Applicant: FUJIFILM Corporation, Tokyo (JP)

(72) Inventors: Shinichi Shimotsu, Saitama (JP); Masahiko Sugimoto, Saitama (JP); Tetsuya Fujikawa, Saitama (JP); Toshihiro Aoi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 156 days.

(21) Appl. No.: 18/152,117

(22) Filed: Jan. 9, 2023

(65) Prior Publication Data

US 2023/0171474 A1 Jun. 1, 2023

Related U.S. Application Data

(63) Continuation of application No. PCT/JP2021/023987, filed on Jun. 24, 2021.

(30) Foreign Application Priority Data

Jul. 29, 2020 (JP) .................................. 2020-128580

(51) Int. Cl.
*H04N 23/11* (2023.01)
*G06T 5/50* (2006.01)
(Continued)

(52) U.S. Cl.
CPC .............. *H04N 23/11* (2023.01); *G06T 5/50* (2013.01); *G06V 10/60* (2022.01); *G06V 10/761* (2022.01);
(Continued)

(58) Field of Classification Search
CPC ........... H04N 23/11; G06V 10/60; G06T 5/50
See application file for complete search history.

(56) References Cited

U.S. PATENT DOCUMENTS

2005/0280901 A1* 12/2005 Tomioka .................. G02B 7/10
359/687
2013/0100539 A1* 4/2013 Mitsuhashi .... G02B 15/143105
359/690
(Continued)

FOREIGN PATENT DOCUMENTS

JP S6211384 1/1987
JP 2002209126 7/2002
(Continued)

OTHER PUBLICATIONS

"International Search Report (Form PCT/ISA/210) of PCT/JP2021/023987," mailed on Sep. 14, 2021, with English translation thereof, pp. 1-5.

(Continued)

*Primary Examiner* — Zhubing Ren
(74) *Attorney, Agent, or Firm* — JCIPRNET

(57) ABSTRACT

Provided are an imaging controller, an operation method and program of the imaging controller, and a camera capable of presenting a radiation image of a subject to a user in an easy-to-understand manner. An image sensor driving control unit causes an image sensor to image a visible ray to acquire a first image including a reflected image of a subject. The image sensor driving control unit causes the image sensor to image an infrared ray to acquire a second image including the reflected image and a radiation image of the subject. A zoom lens driving control unit moves a zoom lens along an optical axis to correct a difference in angle of view between the first image and the second image. Image processing units output difference images between the first image and the second image acquired in a state in which the difference in angle of view is corrected.

12 Claims, 17 Drawing Sheets

(51) Int. Cl.
    *G06V 10/60*         (2022.01)
    *G06V 10/74*         (2022.01)
    *H04N 23/55*        (2023.01)
    *H04N 23/69*        (2023.01)

(52) U.S. Cl.
    CPC ............ *H04N 23/55* (2023.01); *H04N 23/69* (2023.01); *G06T 2207/20224* (2013.01)

(56) References Cited

U.S. PATENT DOCUMENTS

| | | | | |
|---|---|---|---|---|
| 2018/0040109 | A1* | 2/2018 | Hayashi | H04N 23/951 |
| 2018/0045867 | A1* | 2/2018 | Kunugise | H04N 1/407 |
| 2018/0336664 | A1* | 11/2018 | Ono | H04N 23/45 |

FOREIGN PATENT DOCUMENTS

| | | | |
|---|---|---|---|
| JP | 2004354714 | | 12/2004 |
| JP | 2006033716 | | 2/2006 |
| JP | 2006033716 A | * | 2/2006 |
| JP | 2018195085 | | 12/2018 |
| JP | 2019205180 | | 11/2019 |
| WO | 2016171088 | | 10/2016 |

OTHER PUBLICATIONS

"Written Opinion of the International Searching Authority (Form PCT/ISA/237) of PCT/ JP2021/023987," mailed on Sep. 14, 2021, with English translation thereof, pp. 1-8.

\* cited by examiner

| ZOOM LENS MOVEMENT AMOUNT INFORMATION | ~71 |
|---|---|
| POSITION OF ZOOM LENS | MOVEMENT AMOUNT OF ZOOM LENS REQUIRED FOR CORRECTION OF DIFFERENCE IN ANGLE OF VIEW (mm) |
| Z1 | 0.25 |
| Z2 | 0.22 |
| Z3 | 0.2 |
| Z4 | 0.18 |
| ⋮ | ⋮ |

TELEPHOTO SIDE ↕ WIDE ANGLE SIDE

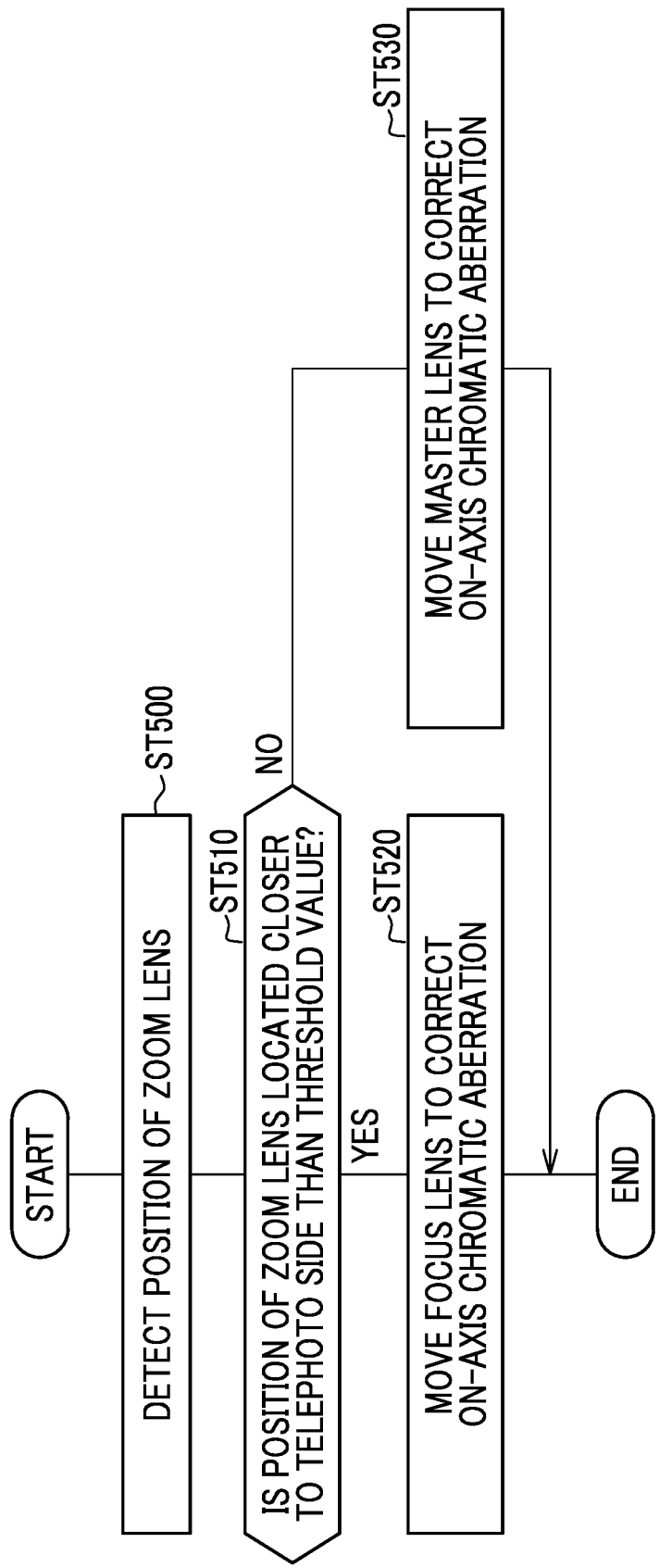

IMAGING CONTROL DEVICE, OPERATION METHOD AND PROGRAM OF IMAGING CONTROL DEVICE, AND IMAGING DEVICE

CROSS-REFERENCE TO RELATED APPLICATIONS

This application is a continuation application of International Application No. PCT/JP2021/023987, filed on Jun. 24, 2021, which is incorporated herein by reference in its entirety. Further, this application claims priority from Japanese Patent Application No. 2020-128580, filed on Jul. 29, 2020, the disclosure of which is incorporated by reference herein in their entirety.

BACKGROUND

Technical Field

The technique of the present disclosure relates to an imaging control device, an operation method and program of the imaging control device, and an imaging device.

Related Art

Description is made in JP2004-354714A that a lens system for visible light/infrared light imaging that enables simultaneous imaging of the same subject with visible light and infrared light comprises a first imaging unit that captures a subject image formed by subject light in a first wavelength region and a second imaging unit that captures a subject image formed by the subject light in a second wavelength region, in which any one wavelength region of a visible light region or an infrared light region is set as the first wavelength region and the other wavelength region thereof is set as the second wavelength region, an optical system that forms an image of first subject light for imaging a subject by the first imaging unit on an imaging surface of the first imaging unit and comprises a focus lens that is movable in an optical axis direction in order to focus on a subject at a desired subject distance, a light-splitting unit that is disposed in the optical system and on a rear side from the focus lens and splits the subject light incident on the optical system into the first subject light and second subject light for imaging the subject by the second imaging unit, a relay optical system that forms again an image of the second subject light, which is divided by the light-splitting unit and subjected to the image forming by the action of the optical system, and comprises a correction lens movable in the optical axis direction to adjust an image-forming position, and a correction lens control unit that controls a position of the correction lens based on a position of the focus lens such that a subject distance of a subject in focus with respect to the imaging surface of the first imaging unit matches a subject distance of a subject in focus with respect to an imaging surface of the second imaging unit.

Description is made in JP2002-209126A that an imaging device that captures and images each of two predetermined electromagnetic waves, emitted by a subject, of different wavelength bands and converts the electromagnetic wave into a video signal of the subject is configured of an optical system that reflects the electromagnetic wave of any one of the wavelength bands and transmits the electromagnetic wave of the other wavelength band, a first camera that captures and images the reflected electromagnetic wave due to the reflection and converts the electromagnetic wave into a video signal, and a second camera that captures and images the transmitted electromagnetic wave due to the transmission and converts the electromagnetic wave into a video signal.

Description is made in JP1987-011384A (JP-S62-011384A) that a TV camera monitoring device that displays, on a display device, and monitors an image of a monitored device captured by a TV camera is provided with a light separator that separates incident light incident from an optical lens system into a visible ray and an infrared ray and an imaging tube for imaging each image formed by the separated visible ray and infrared ray, respectively, on the TV camera, and an image signal processing circuit that receives each image signal from the imaging tube of the TV camera and displays a visible ray image and an infrared ray image on the display device in a superimposed manner.

SUMMARY

One embodiment according to the technique of the present disclosure provides an imaging control device, an operation method and program of the imaging control device, and an imaging device capable of presenting a radiation image of a subject to a user in an easy-to-understand manner.

An imaging control device according to the present disclosure is an imaging control device that controls an operation of an imaging device having a first filter, a second filter, a correction lens, a zoom function, and an image sensor and that comprises a processor, and a memory connected to or built into the processor. The first filter transmits a visible ray. The second filter transmits an infrared ray. The processor is configured to selectively insert the first filter and the second filter into an optical path, move the correction lens along an optical axis to correct an on-axis chromatic aberration between the visible ray transmitted through the first filter and the infrared rays transmitted through the second filter, cause the image sensor to image the visible ray transmitted through the first filter to acquire a first image including a reflected image of a subject, cause the image sensor to image the infrared ray transmitted through the second filter to acquire a second image including the reflected image and a radiation image of the subject, operate the zoom function to correct a difference in angle of view between the first image and the second image caused by the movement of the correction lens along the optical axis, and output a third image including the radiation image based on the first image and the second image acquired in a state in which the difference in angle of view is corrected.

It is preferable that the processor is configured to output the third image only in a case where a preset execution condition is satisfied.

It is preferable that the execution condition includes a content that a brightness level of the reflected image included in the first image is equal to or larger than a preset threshold value.

It is preferable that the processor is configured to, in a case where the brightness level is less than the threshold value, output the first image acquired and stored in advance in a case where the brightness level is equal to or larger than the threshold value and the second image acquired in a state in which the difference in angle of view is corrected.

It is preferable that the execution condition includes a content that an instruction to execute the output of the third image is received.

It is preferable that the processor is configured to generate a difference image between the first image and the second image as the third image.

It is preferable that the processor is configured to match a brightness level of the reflected image included in the first image with a brightness level of the reflected image included in the second image and then generate the difference image.

It is preferable that the processor is configured to generate the difference image in a state in which a brightness level of the reflected image included in the first image is different from a brightness level of the reflected image included in the second image.

It is preferable that the imaging device has a zoom lens and the processor is configured to move the zoom lens along the optical axis to correct the difference in angle of view between the first image and the second image caused by the movement of the correction lens along the optical axis.

It is preferable that the processor is configured to change a movement amount of the zoom lens required for the correction of the difference in angle of view according to a position of the zoom lens in a case where the on-axis chromatic aberration is corrected.

It is preferable that the processor is configured to move the correction lens to adjust a focus deviated by the movement of the zoom lens in a case where the difference in angle of view is corrected.

An imaging device of the present disclosure comprises the imaging control device according to any one of the above.

An operation method of an imaging control device according to the present disclosure is an operation method of an imaging control device that controls an operation of an imaging device having a first filter that transmits a visible ray, a second filter that transmits an infrared ray, a correction lens, a zoom function, and an image sensor. The operation method comprises selectively inserting the first filter and the second filter into an optical path, moving the correction lens along an optical axis to correct an on-axis chromatic aberration between the visible ray transmitted through the first filter and the infrared rays transmitted through the second filter, causing the image sensor to image the visible ray transmitted through the first filter to acquire a first image including a reflected image of a subject, causing the image sensor to image the infrared ray transmitted through the second filter to acquire a second image including the reflected image and a radiation image of the subject, operating the zoom function to correct a difference in angle of view between the first image and the second image caused by the movement of the correction lens along the optical axis, and outputting a third image including the radiation image based on the first image and the second image acquired in a state in which the difference in angle of view is corrected.

A program of the present disclosure is a program that controls an operation of an imaging device having a first filter that transmits a visible ray, a second filter that transmits an infrared ray, a correction lens, a zoom function, and an image sensor. The program causes a computer to execute a process comprising selectively inserting the first filter and the second filter into an optical path, moving the correction lens along an optical axis to correct an on-axis chromatic aberration between the visible ray transmitted through the first filter and the infrared rays transmitted through the second filter, causing the image sensor to image the visible ray transmitted through the first filter to acquire a first image including a reflected image of a subject, causing the image sensor to image the infrared ray transmitted through the second filter to acquire a second image including the reflected image and a radiation image of the subject, operating the zoom function to correct a difference in angle of view between the first image and the second image caused by the movement of the correction lens along the optical axis, and outputting a third image including the radiation image based on the first image and the second image acquired in a state in which the difference in angle of view is corrected.

BRIEF DESCRIPTION OF THE DRAWINGS

FIG. 24 is a flowchart showing an operation procedure of a control unit of the fourth embodiment.

DETAILED DESCRIPTION

First Embodiment

Figure 1:
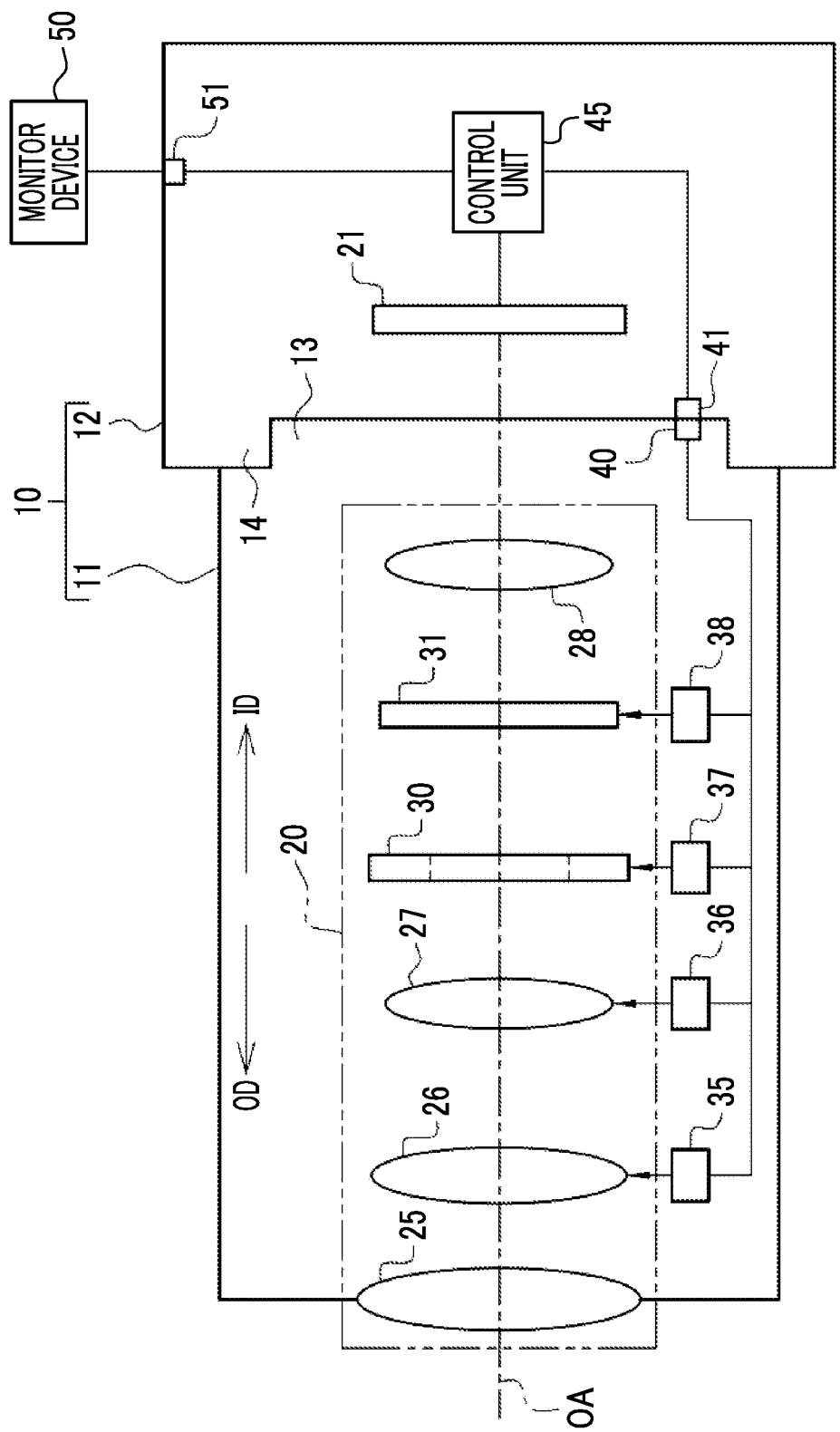
FIG. 1 is a diagram showing a camera.

As shown in FIG. 1 as an example, a camera 10 is a surveillance camera installed in, for example, a factory, and comprises a lens barrel 11 and a main body 12. The lens barrel 11 is provided with a lens-barrel side mount 13, and the main body 12 is provided with a main-body side mount 14. The lens barrel 11 is attached to the main body 12 by the lens-barrel side mount 13 and the main-body side mount 14. An imaging optical system 20 is built into the lens barrel 11, and an image sensor 21 is built into the main body 12. The camera 10 is an example of an "imaging device (camera)" according to the technique of the present disclosure.

The imaging optical system 20 has a plurality of types of lenses for forming an image of subject light SL (refer to FIG. 5) on the image sensor 21. Specifically, the imaging optical system 20 has an objective lens 25, a focus lens 26, a zoom lens 27, and a master lens 28. Each of these lenses 25 to 28 is disposed in the order of the objective lens 25, the focus lens 26, the zoom lens 27, and the master lens 28 from an object side (subject side) toward an image-forming side (image sensor 21 side). Each of the lenses 25 to 28 transmits light in a wavelength range from 400 nm to 1700 nm, that is, light in a wavelength range from a visible light range to a near infrared range. Although simplified in FIG. 1, each of the lenses 25 to 28 is actually a lens group in which a plurality of lenses are combined.

The imaging optical system 20 also has a stop 30 and a filter unit 31. The stop 30 is disposed between the zoom lens 27 and the filter unit 31. The filter unit 31 is disposed between the stop 30 and the master lens 28.

The lens barrel 11 is provided with a focus lens driving mechanism 35, a zoom lens driving mechanism 36, a stop driving mechanism 37, and a filter unit driving mechanism 38. As is well known, the focus lens driving mechanism 35 holds the focus lens 26 and includes a cam ring for focusing in which a cam groove is formed on the outer periphery thereof, a motor for focusing that rotates the cam ring for focusing around an optical axis OA to move the cam ring for focusing along the optical axis OA, and the like. Similarly, the zoom lens driving mechanism 36 holds the zoom lens 27 and includes a cam ring for zoom in which a cam groove is formed on the outer periphery thereof, a motor for zoom that rotates the cam ring for zoom around the optical axis OA to move the cam ring for zoom along the optical axis OA, and the like. In the following, a direction parallel to the optical axis OA and toward the image-forming side from the object side is denoted as an image-forming-side direction ID, and a direction parallel to the optical axis OA and toward the object side from the image-forming side is denoted as an object-side direction OD. The term "parallel" as used herein refers to parallelism in a sense including an error generally allowed in the technical field to which the technique of the present disclosure belongs, in addition to perfect parallelism.

As is well known, the stop driving mechanism 37 includes a motor that opens and closes a plurality of stop leaf blades of the stop 30 and the like. The filter unit driving mechanism 38 includes a motor that rotates the filter unit 31 in one direction with a center thereof as an axis and the like.

The motor for focusing and the motor for zoom are, for example, stepping motors. In this case, positions of the focus lens 26 and the zoom lens 27 on the optical axis OA can be derived from drive amounts of the motor for focusing and the motor for zoom. Instead of the drive amount of the motor, a position sensor may be provided to detect the positions of the focus lens 26 and the zoom lens 27.

The filter unit driving mechanism 38 is provided with a rotation position sensor that detects a rotation position of the filter unit 31. The rotation position sensor is, for example, a rotary encoder.

An electric component such as the motor of each of the driving mechanisms 35 to 38 is connected to a lens-barrel side contact 40 provided in the lens-barrel side mount 13. A main-body side contact 41 is provided at a position corresponding to the lens-barrel side contact 40 of the main-body side mount 14. A control unit 45 is connected to the main-body side contact 41. The control unit 45 is an example of an "imaging control device (imaging controller)" according to the technique of the present disclosure. In a case where the lens barrel 11 is attached to the main body 12 via the lens-barrel side mount 13 and the main-body side mount 14, the lens-barrel side contact 40 is in contact with the main-body side contact 41. Accordingly, the electric components of the driving mechanisms 35 to 38 and the control unit 45 are electrically connected to each other.

The electric components of the driving mechanisms 35 to 38 are driven under the control of the control unit 45. More specifically, the control unit 45 issues a drive signal in response to an instruction from a user input via a monitor device 50 to drive the electric components of the driving mechanisms 35 to 38. For example, in a case where an instruction to change an angle of view to a telephoto side is input via the monitor device 50, the control unit 45 issues the drive signal to the motor for zoom of the zoom lens driving mechanism 36 to move the zoom lens 27 to the telephoto side. The monitor device 50 is composed of, for example, a touch panel. Alternatively, the monitor device 50 is composed of, for example, a display, a keyboard, and a mouse. The monitor device 50 is installed in a remote location away from the camera 10, for example, in a control room and is connected to the main body 12 via a connector 51.

The motor for focusing and the motor for zoom output the drive amount to the control unit 45. The control unit 45 derives the positions of the focus lens 26 and the zoom lens 27 on the optical axis OA from the drive amount. Further, the rotation position sensor outputs the rotation position of the filter unit 31 to the control unit 45. Accordingly, the control unit 45 grasps the rotation position of the filter unit 31.

The image sensor 21 has a light-receiving surface that receives the subject light SL. The image sensor 21 is disposed such that a center of the light-receiving surface matches the optical axis OA and the light-receiving surface is orthogonal to the optical axis OA. The light-receiving surface of the image sensor 21 is made of indium gallium arsenide (InGaAs). Therefore, the image sensor 21 can detect the subject image based on the light transmitted through the imaging optical system 20 in the wavelength range from 400 nm to 1700 nm, that is, the light in the wavelength range from the visible light range to the near infrared range. The term "orthogonal" as used herein refers to orthogonality in a sense including an error generally allowed in the technical field to which the technique of the present disclosure belongs, in addition to perfect orthogonality.

Figure 2:
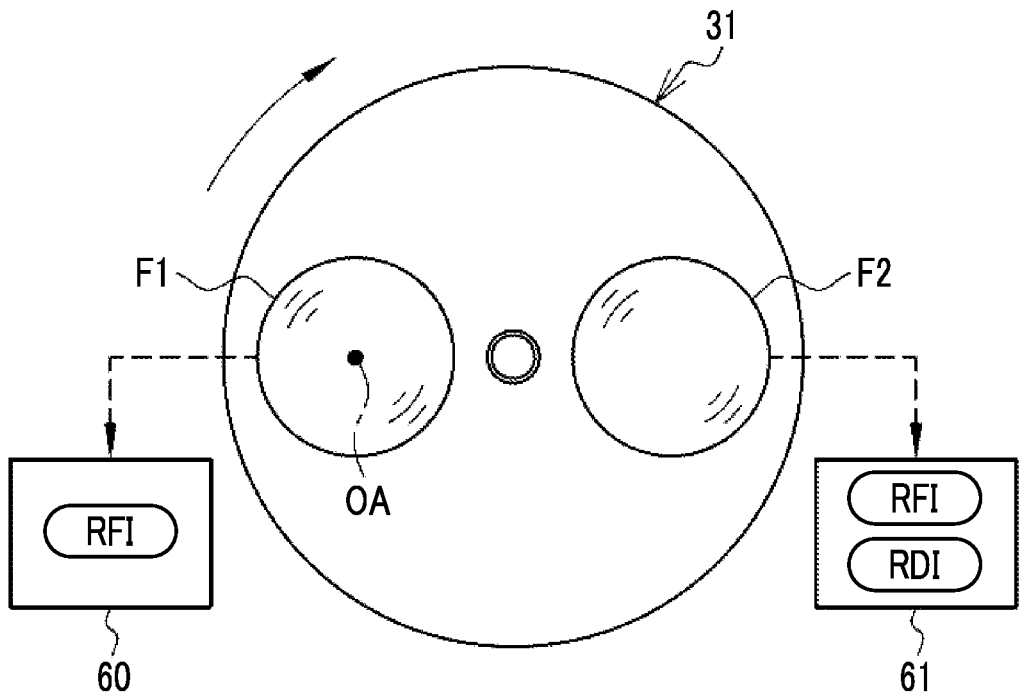
FIG. 2 is a diagram showing a filter unit.

As shown in FIG. 2 as an example, the filter unit 31 is a circular disk in which two filters F1 and F2 of a first filter F1 and a second filter F2 are arranged in an annular shape at equal intervals (every 180° in FIG. 2). The filter unit 31 is rotated clockwise by the filter unit driving mechanism 38 in order to switch the filters F1 and F2 every one frame. The term "equal interval" as used herein refers to an equal interval in a sense including an error generally allowed in the technical field to which the technique of the present disclosure belongs, in addition to perfect equal interval. The filter unit 31 may be rotated counterclockwise. Further, the filter unit 31 may not be the circular disk, and may have a rectangular shape or another shape.

The filter unit 31 returns from a first position in the drawing disposed such that a center of the first filter F1 matches the optical axis OA to the first position again after passing through a second position disposed such that a center of the second filter F2 matches the optical axis OA. That is, the filters F1 and F2 are sequentially inserted into an optical path as the filter unit 31 rotates clockwise.

Each of the first filter F1 and the second filter F2 selectively transmits light in a preset wavelength range. The first filter F1 transmits a visible ray VR (refer to FIG. 5). The visible ray VR transmitted through the first filter F1 is, for example, light in a wavelength range of 400 nm to 770 nm. The second filter F2 transmits an infrared ray IR (refer to FIG. 5). The infrared ray IR transmitted through the second filter F2 is, for example, light in a wavelength range of 1550±100 nm (1450 nm to 1650 nm). A range of numerical values represented by using "to" means a range including numerical values described before and after "to" as a lower limit value and an upper limit value.

The image sensor 21 images the visible ray VR transmitted through the first filter F1 to obtain a first image 60 including a reflected image RFI of the subject. Further, the image sensor 21 images the infrared ray IR transmitted through the second filter F2 to obtain a second image 61 including the reflected image RFI and a radiation image RDI of the subject. The radiation image RDI represents a temperature of the subject. The range of the temperature of the subject represented by the radiation image RDI is, for example, 200° C. to 2000° C.

Figure 3:
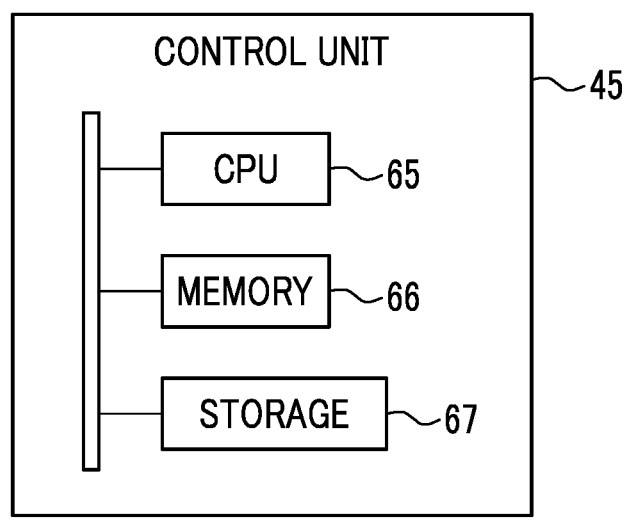
FIG. 3 is a block diagram showing a computer constituting a control unit.

As shown in FIG. 3 as an example, the control unit 45 is formed by a computer including a central processing unit (CPU) 65, a memory 66, and a storage 67. The memory 66 is, for example, a random access memory (RAM) or the like and temporarily stores various kinds of information. The storage 67, which is a non-transitory storage medium, is, for example, a hard disk drive, a solid state drive, or the like, and stores various parameters and various programs. The CPU 65 loads the program stored in the storage 67 into the memory 66 and executes processing according to the program to integrally control the operation of each unit of the camera 10. The memory 66 may be built into the CPU 65. The program may be recorded and distributed on an external recording medium (not shown) and installed by the CPU 65 from the recording medium. Alternatively, the program may be stored in a server or the like connected to a network in a state of being accessible from the outside, downloaded to the memory 66 or the storage 67 by the CPU 65 in response to a request, and installed and executed.

Figure 4:
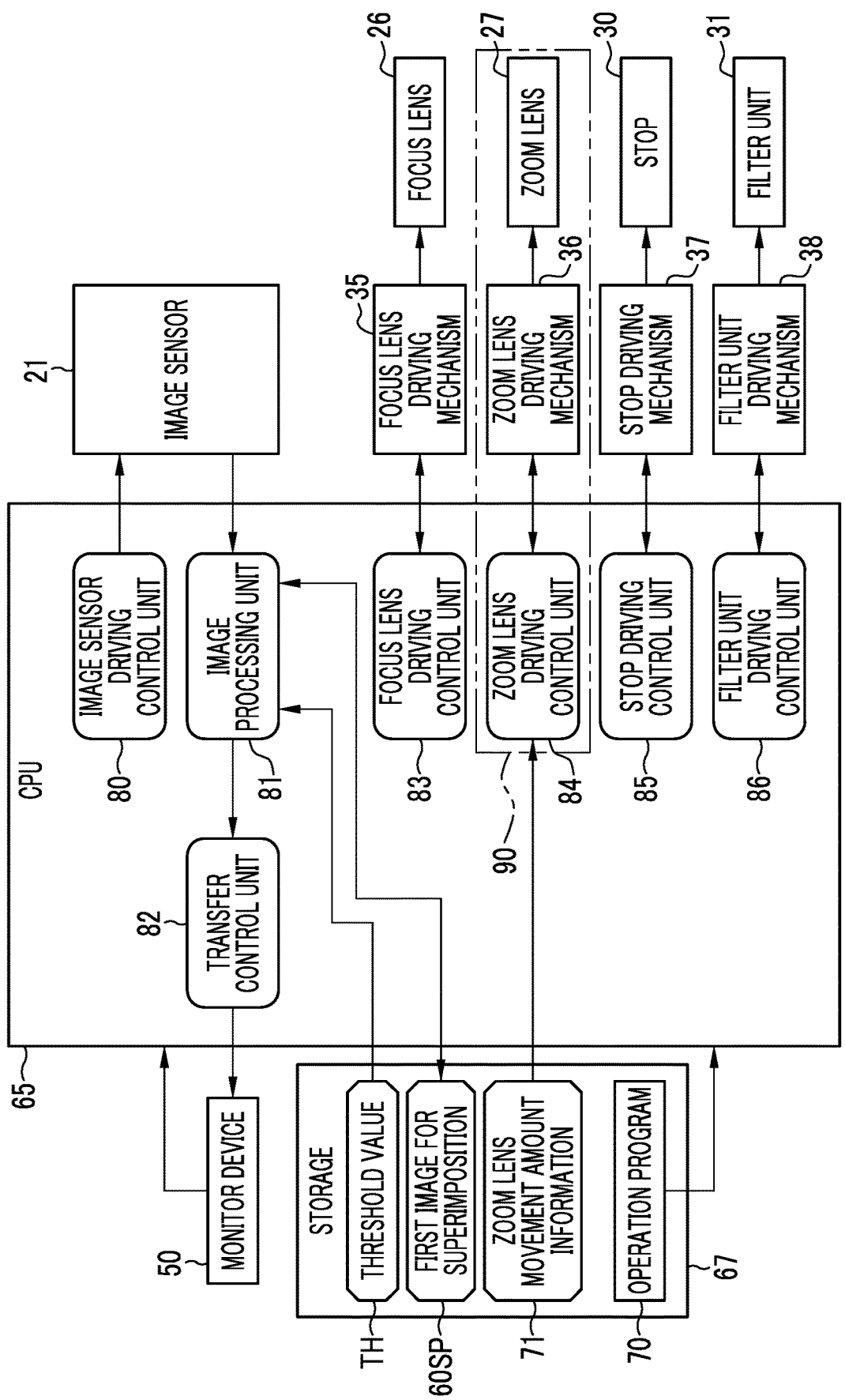
FIG. 4 is a block diagram of a CPU.

As shown in FIG. 4 as an example, an operation program 70 is stored in the storage 67. The operation program 70 is an application program for causing the computer constituting the control unit 45 to function as the imaging control device. That is, the operation program 70 is an example of the "program" according to the technique of the present disclosure. In addition to the operation program 70, the storage 67 also stores a threshold value TH, a first image for superimposition 60SP, and zoom lens movement amount information 71.

In a case where the operation program 70 is started, the CPU 65 cooperates with the memory 66 and the like to function as an image sensor driving control unit 80, an image processing unit 81, a transfer control unit 82, a focus lens driving control unit 83, a zoom lens driving control unit 84, a stop driving control unit 85, and a filter unit driving control unit 86. The CPU 65 is an example of a "processor" according to the technique of the present disclosure.

The image sensor driving control unit 80 controls the drive of the image sensor 21. In a case where an instruction to start the imaging is input via the monitor device 50, the image sensor driving control unit 80 causes the image sensor 21 to image the subject light SL at a preset frame rate, for example, 30 frames per second (fps). The image sensor 21 outputs an image obtained by imaging the subject light SL to the image processing unit 81.

The image processing unit 81 performs various types of image processing on the image from the image sensor 21. The image processing unit 81 outputs the image after the image processing to the transfer control unit 82. The transfer control unit 82 transfers the image from the image processing unit 81 to the monitor device 50.

The focus lens driving control unit 83 controls the drive of the focus lens driving mechanism 35. For example, the focus lens driving control unit 83 moves the focus lens 26 along the optical axis OA via the focus lens driving mechanism 35 to correct an on-axis chromatic aberration of two types of light transmitted through the first filter F1 and the second filter F2 of the filter unit 31. That is, the focus lens 26 is an example of a "correction lens" according to the technique of the present disclosure.

The zoom lens driving control unit 84 controls the drive of the zoom lens driving mechanism 36. With the movement of the focus lens 26 along the optical axis OA to correct the on-axis chromatic aberration, a difference in angle of view is generated between the first image 60 and the second image 61. Thus, the zoom lens driving control unit 84 moves the zoom lens 27 along the optical axis OA via the zoom lens driving mechanism 36 to correct the difference in angle of view between the first image 60 and the second image 61, which is caused by the movement of the focus lens 26 along the optical axis OA. The zoom lens 27, the zoom lens driving mechanism 36, the zoom lens driving control unit 84, and the like constitute an optical zoom function 90. The optical zoom function 90 is an example of a "zoom function" according to the technique of the present disclosure.

The stop driving control unit 85 controls the drive of the stop driving mechanism 37 such that an amount of the subject light SL is appropriate. The filter unit driving control unit 86 controls the drive of the filter unit driving mechanism 38 such that the filters F1 and F2 are selectively inserted into the optical path every one frame.

Figure 5:
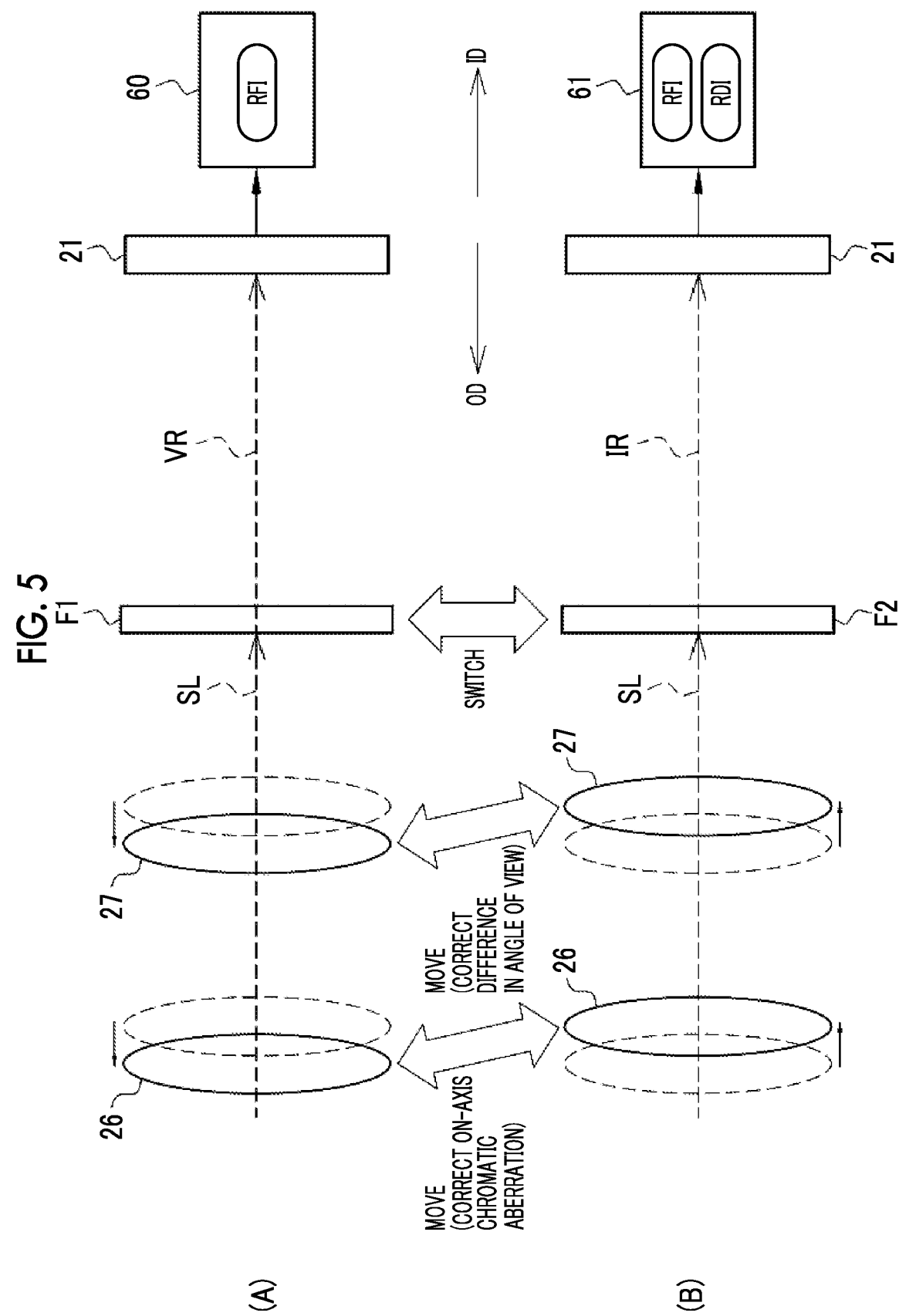
FIG. 5 is a diagram showing a state in which each filter is inserted into an optical path, (A) of FIG. 5 shows a state in which a first filter is inserted into the optical path, and (B) of FIG. 5 shows a state in which a second filter is inserted into the optical path.

As shown in (A) of FIG. 5 as an example, in a case where the first filter F1 is inserted into the optical path, the focus lens driving control unit 83 moves the focus lens 26 to the object-side direction OD from a position in a case where the second filter F2 in (B) of FIG. 5 is inserted into the optical path to correct the on-axis chromatic aberration. Further, the zoom lens driving control unit 84 moves the zoom lens 27 to the object-side direction OD from the position in the case where the second filter F2 in (B) of FIG. 5 is inserted into the optical path to correct the difference in angle of view.

As shown in (B) of FIG. 5 as an example, in the case where the second filter F2 is inserted into the optical path, the focus lens driving control unit 83 moves the focus lens 26 to the image-forming-side direction ID from a position in the case where the first filter F1 in (A) of FIG. 5 is inserted into the optical path to correct the on-axis chromatic aberration. Further, the zoom lens driving control unit 84 moves the zoom lens 27 to the image-forming-side direction ID from the position in the case where the first filter F1 in (A) of FIG. 5 is inserted into the optical path to correct the difference in angle of view.

In a state in which the on-axis chromatic aberration is corrected and the difference in angle of view is corrected in this manner, the image sensor 21 images the visible ray VR transmitted through the first filter F1 in the case of (A) of FIG. 5 to output the first image 60 including the reflected image RFI. Further, the image sensor 21 images the infrared ray IR transmitted through the second filter F2 in the case of (B) of FIG. 5 to output the second image 61 including the reflected image RFI and the radiation image RDI.

The on-axis chromatic aberration increases as the position of the zoom lens 27 is closer to the telephoto side. Thus, a movement amount of the focus lens 26 required for correcting the on-axis chromatic aberration increases as the position of the zoom lens 27 is closer to the telephoto side. Therefore, a movement amount of the zoom lens 27 required for correcting the difference in angle of view also changes according to the position of the zoom lens 27 in a case where the on-axis chromatic aberration is corrected. The zoom lens driving control unit 84 refers to the zoom lens movement amount information 71 to change the movement amount of the zoom lens 27 required for correcting the difference in angle of view according to the position of the zoom lens 27 in a case where the on-axis chromatic aberration is corrected.

Figures 6, 7:
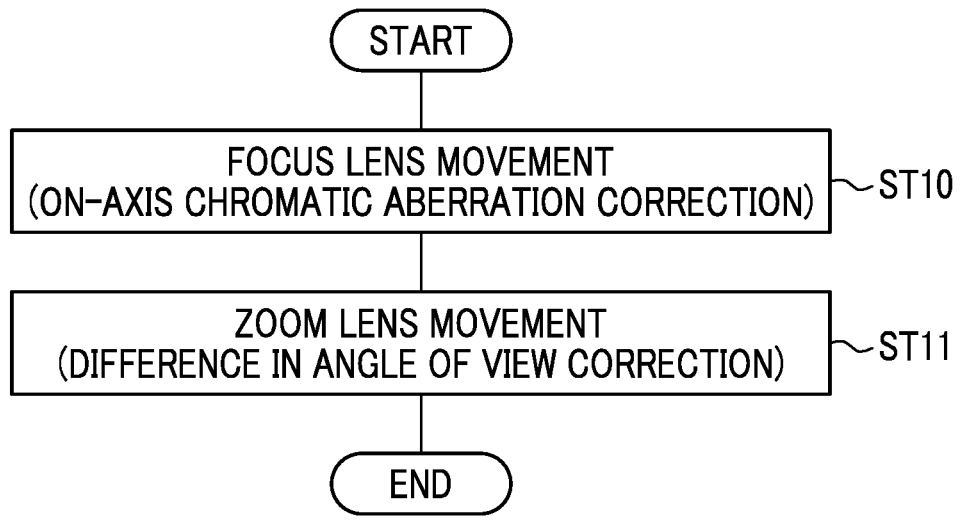
FIG. 6 is a table showing zoom lens movement amount information.
FIG. 7 is a flowchart showing movements of a focus lens and a zoom lens in a case where the second filter is inserted into the optical path.

As shown in FIG. 6 as an example, the movement amount of the zoom lens 27 required for correcting the difference in angle of view and corresponding to the position of the zoom lens 27 in a case where the on-axis chromatic aberration is corrected is registered in the zoom lens movement amount information 71. A larger value of the movement amount of the zoom lens 27 is registered as the position of the zoom lens 27 is closer to the telephoto side. For example, a maximum value of 0.25 mm is registered in Z1 which is a position on the most telephoto side.

Each of the lenses 25 to 28 included in the imaging optical system 20 is designed for the infrared ray IR. Thus, in the case where the second filter F2 is inserted into the optical path, the focus does not deviate with the movement of the zoom lens 27 for correcting the difference in angle of view. Therefore, as shown in FIG. 7 as an example, in the case where the second filter F2 is inserted into the optical path, after the focus lens driving control unit 83 moves the focus lens 26 to correct the on-axis chromatic aberration (step ST10), the zoom lens driving control unit 84 may move the zoom lens 27 once to correct the difference in angle of view (step ST11).

Figure 8:
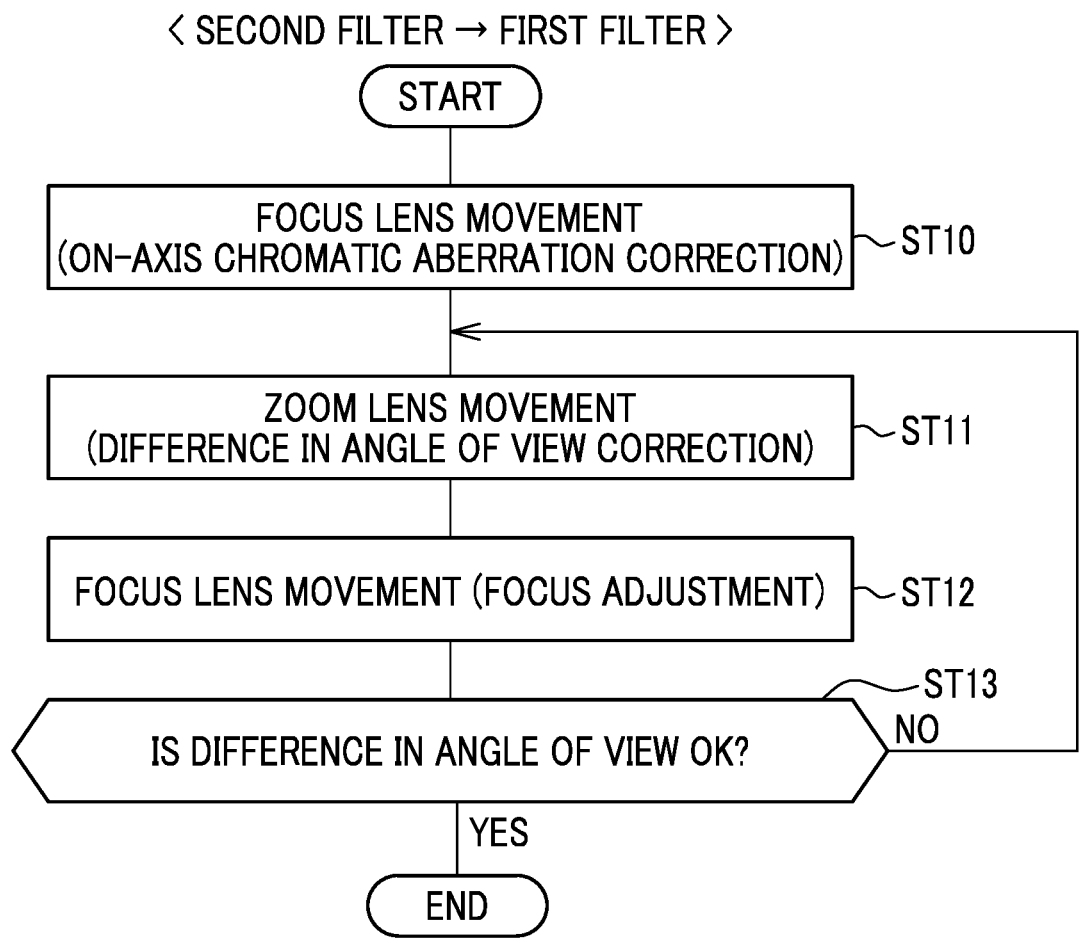
FIG. 8 is a flowchart showing movements of the focus lens and the zoom lens in a case where the first filter is inserted into the optical path.

On the other hand, in the case where the first filter F1 is inserted into the optical path, the focus deviates with the movement of the zoom lens 27 for correcting the difference in angle of view. Therefore, as shown in FIG. 8 as an example, in the case where the first filter F1 is inserted into the optical path, the focus lens driving control unit 83 moves the focus lens 26 to correct the on-axis chromatic aberration (step ST10), the zoom lens driving control unit 84 moves the zoom lens 27 to correct the difference in angle of view (step ST11), and then the focus lens driving control unit 83 moves the focus lens 26 again to adjust the deviated focus (step ST12). These steps ST11 and ST12 are repeated until the difference in angle of view is within an allowable range (YES in step ST13).

Figure 9:
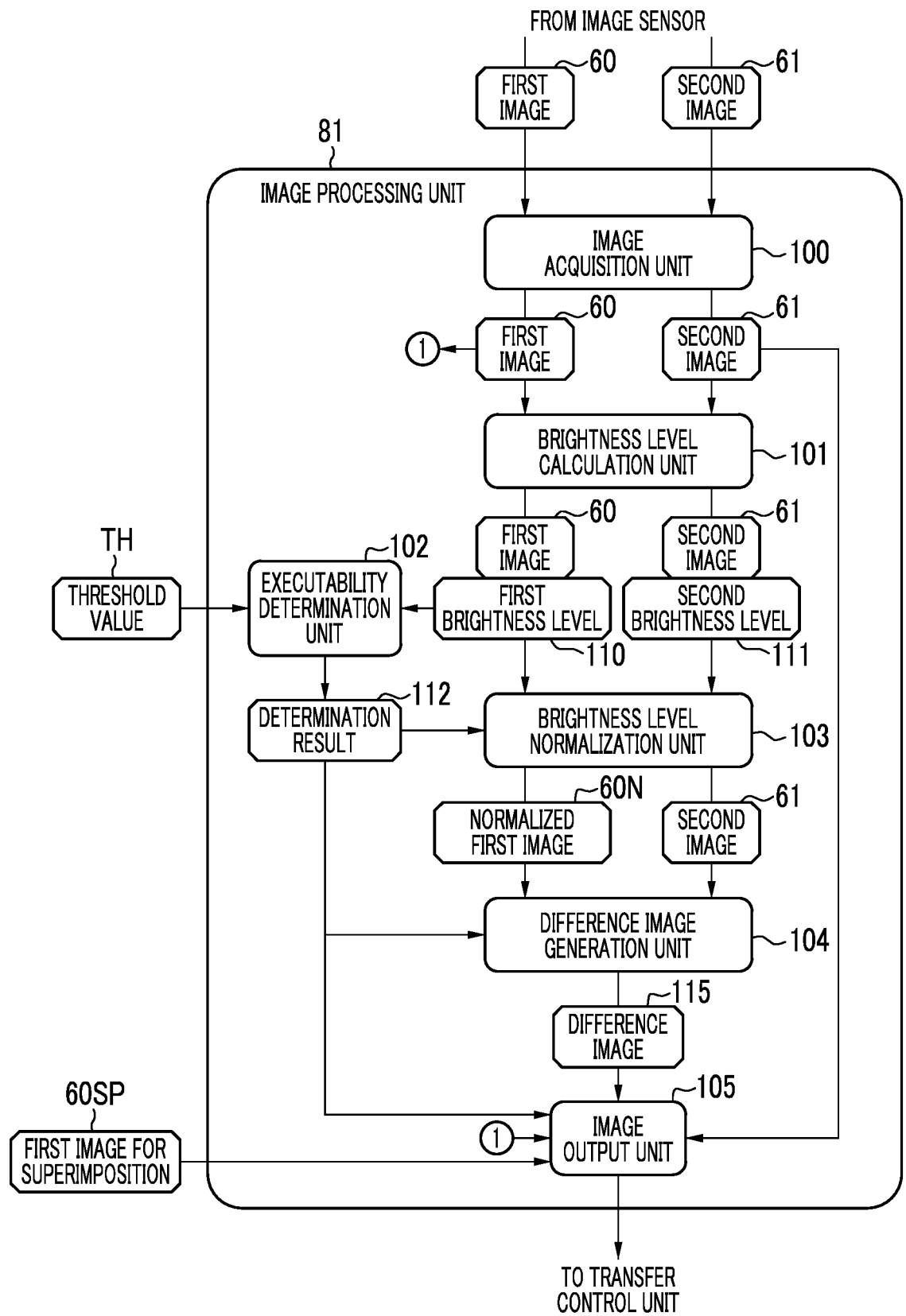
FIG. 9 is a block diagram showing details of an image processing unit.

As shown in FIG. 9 as an example, the image processing unit 81 includes an image acquisition unit 100, a brightness level calculation unit 101, an executability determination unit 102, a brightness level normalization unit 103, a difference image generation unit 104, and an image output unit 105.

The image acquisition unit 100 acquires the first image 60 from the image sensor 21. The image acquisition unit 100 performs various types of image processing such as gradation transformation processing on the acquired first image 60 and then outputs the first image 60 to the brightness level calculation unit 101 and the image output unit 105. Similarly, the image acquisition unit 100 acquires the second image 61 from the image sensor 21, performs various types of image processing on the second image 61, and then outputs the second image 61 to the brightness level calculation unit 101 and the image output unit 105. The first image 60 and the second image 61 acquired by the image acquisition unit 100 are images in which the difference in angle of view is corrected.

The brightness level calculation unit 101 calculates a first brightness level 110, which is a brightness level of the reflected image RFI included in the first image 60. The brightness level calculation unit 101 outputs the calculated first brightness level 110 to the executability determination unit 102. Further, the brightness level calculation unit 101 outputs the calculated first brightness level 110 and the first image 60 to the brightness level normalization unit 103. Similarly, the brightness level calculation unit 101 calculates a second brightness level 111, which is a brightness level of the reflected image RFI included in the second image 61. The brightness level calculation unit 101 outputs the calculated second brightness level 111 and the second image 61 to the brightness level normalization unit 103.

The brightness level calculation unit 101 extracts, for example, a region of the second image 61 where a pixel value is equal to or larger than a preset threshold value as a region where the radiation image RDI is shown and a region of the second image 61 where the pixel value is less than the threshold value as a region where the reflected image RFI is shown. The brightness level calculation unit 101 calculates, as a second brightness level 111, a representative value of brightness values of pixels in the region where the reflected image RFI of the second image 61 is shown. Further, the brightness level calculation unit 101 extracts a region of the first image 60 corresponding to the region where the reflected image RFI of the second image 61 is shown as a region where the reflected image RFI of the first image 60 is shown. The brightness level calculation unit 101 calculates, as the first brightness level 110, a representative value of brightness values of pixels in the region where the reflected image RFI of the first image 60 is shown. The representative value is any one of a maximum value, a most frequent value, a median value, and an average value. The region where the reflected image RFI of the first image 60 is shown and the region where the reflected image RFI of the second image 61 is shown may be designated by the user via the monitor device 50.

The executability determination unit 102 determines whether or not processing of outputting a difference image 115 between the first image 60 and the second image 61 is executable, based on whether or not an execution condition related to the threshold value TH and the first brightness level 110 is satisfied. The executability determination unit 102 outputs a determination result 112 of the executability to the brightness level normalization unit 103, the difference image generation unit 104, and the image output unit 105.

The executability determination unit 102 determines whether or not the execution is possible at preset time intervals. The preset time interval is, for example, every frame, every few minutes, or every few hours.

The brightness level normalization unit 103 operates only in a case where the execution condition is satisfied and the determination result 112 from the executability determination unit 102 is "execute". The brightness level normalization unit 103 normalizes the first brightness level 110 of the first image 60 in accordance with the second brightness level 111 of the second image 61, and thus the first image 60 becomes a normalized first image 60N. The brightness level normalization unit 103 outputs the normalized first image 60N and the second image 61 to the difference image generation unit 104.

Similar to the brightness level normalization unit 103, the difference image generation unit 104 operates only in the case where the execution condition is satisfied and the determination result 112 from the executability determination unit 102 is "execute". The difference image generation unit 104 takes a difference between pixel values for each corresponding pixel of the normalized first image 60N and the second image 61 to generate the difference image 115. The difference image generation unit 104 outputs the generated difference image 115 to the image output unit 105. The difference image 115 is an example of a "third image" according to the technique of the present disclosure.

In the case where the execution condition is satisfied and the determination result 112 from the executability determination unit 102 is "execute", the image output unit 105 outputs the first image 60, the second image 61, and the difference image 115 to the transfer control unit 82. The transfer control unit 82 transfers the first image 60, the second image 61, and the difference image 115 to the monitor device 50. On the other hand, in a case where the execution condition is not satisfied and the determination result 112 from the executability determination unit 102 is "not executed", the image output unit 105 outputs the first image for superimposition 60SP and the second image 61 to the transfer control unit 82. The transfer control unit 82 transfers the first image for superimposition 60SP and the second image 61 to the monitor device 50. That is, the image output unit 105 outputs the difference image 115 only in a case where the execution condition is satisfied.

In a case where the first brightness level 110 is equal to or larger than the threshold value TH, the first image for superimposition 60SP is an image acquired by capturing the reflected image RFI by the image sensor 21. The first image for superimposition 60SP is acquired, for example, by a user's instruction via the monitor device 50 and is stored in the storage 67. The case where the first brightness level 110 is equal to or larger than the threshold value TH is, for example, daytime. The first image for superimposition 60SP may be acquired and stored at a time point designated in advance by the user.

Figure 10:
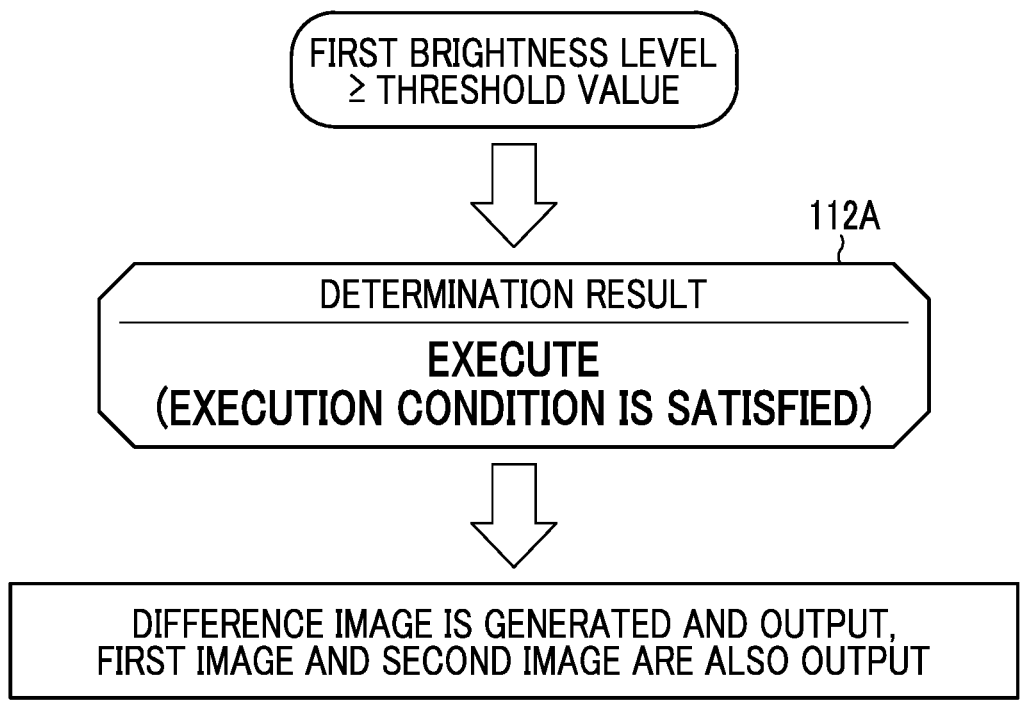
FIG. 10 is a diagram showing a determination result in a case where a first brightness level is equal to or larger than a threshold value.
Figure 11:
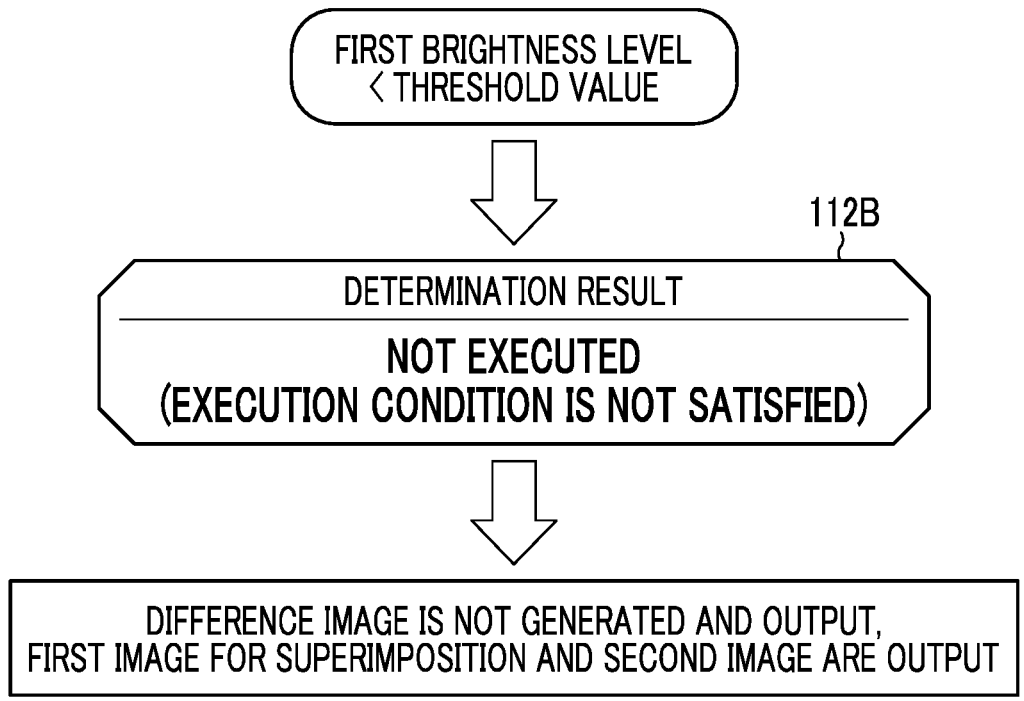
FIG. 11 is a diagram showing a determination result in a case where the first brightness level is less than the threshold value.

As shown in FIG. 10 as an example, in a case where the first brightness level 110 is equal to or larger than the threshold value TH, the executability determination unit 102 determines that the execution condition is satisfied, and outputs a determination result 112A of "execute". On the other hand, as shown in FIG. 11 as an example, in a case where the first brightness level 110 is less than the threshold value TH, the executability determination unit 102 determines that the execution condition is not satisfied, and outputs a determination result 112B of "not executed". In a case where the first brightness level 110 is a value higher than the threshold value TH, the threshold value TH is set to a value with which the radiation image RDI is difficult to be observed due to brightness of the reflected image RFI of the second image 61 corresponding to the reflected image RFI of the first image 60.

Figure 12:
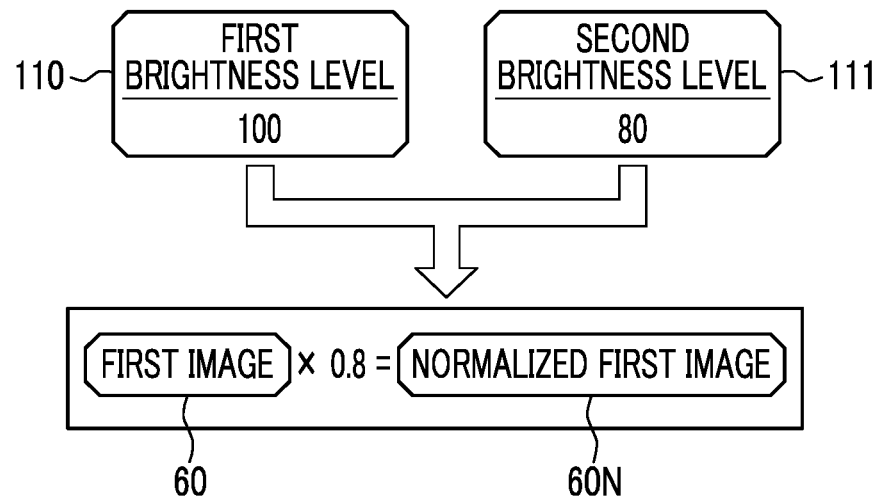
FIG. 12 is a diagram showing a specific example of normalization by a brightness level normalization unit.

FIG. 12 shows a specific example of the normalization by the brightness level normalization unit 103. In a case where the first brightness level 110 is "100" and the second brightness level 111 is "80", the brightness level normalization unit 103 multiplies the pixel value of each pixel of the first image 60 by 0.8, and thus the first image 60 becomes the normalized first image 60N.

Figure 13:
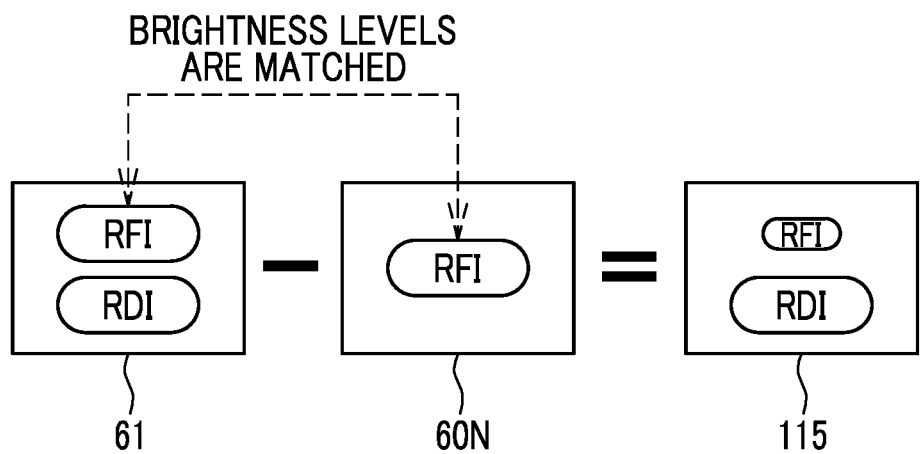
FIG. 13 is a diagram showing formation of a difference image.

FIG. 13 shows formation of the difference image 115. The difference image generation unit 104 subtracts the normalized first image 60N from the second image 61 to generate the difference image 115. The second brightness level 111 of the reflected image RFI included in the second image 61 matches the first brightness level 110 of the reflected image RFI included in the normalized first image 60N. Thus, the difference image 115 becomes an image of substantially only the radiation image RDI with most of the reflected image RFI of the second image 61 removed.

Figure 14:
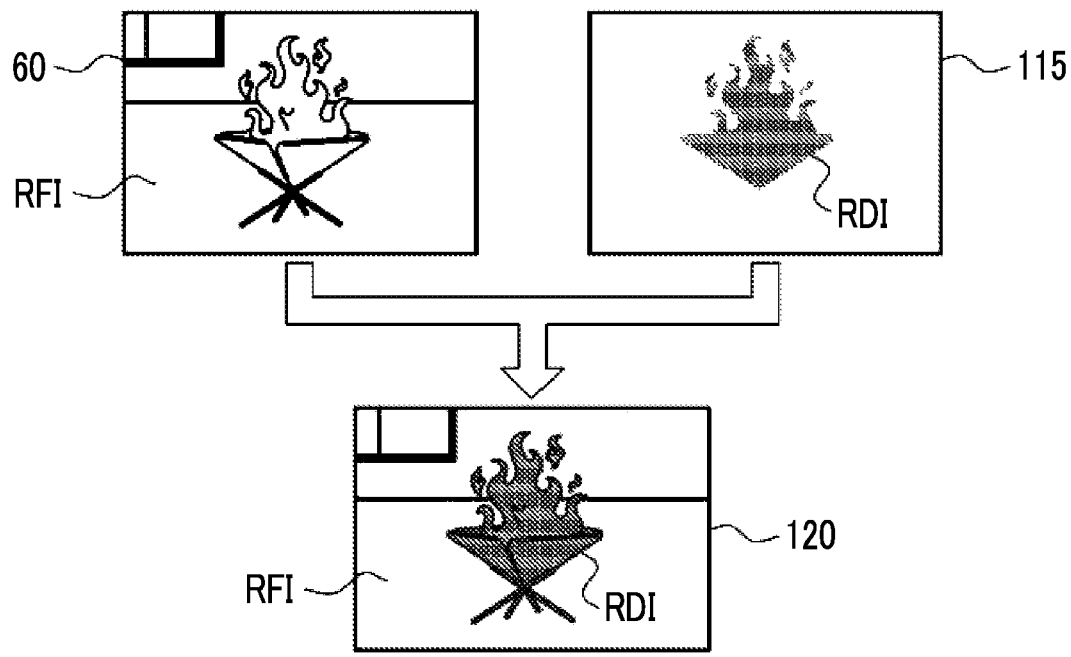
FIG. 14 is a diagram showing a state in which a superimposed image of a first image and the difference image is generated.
Figure 15:
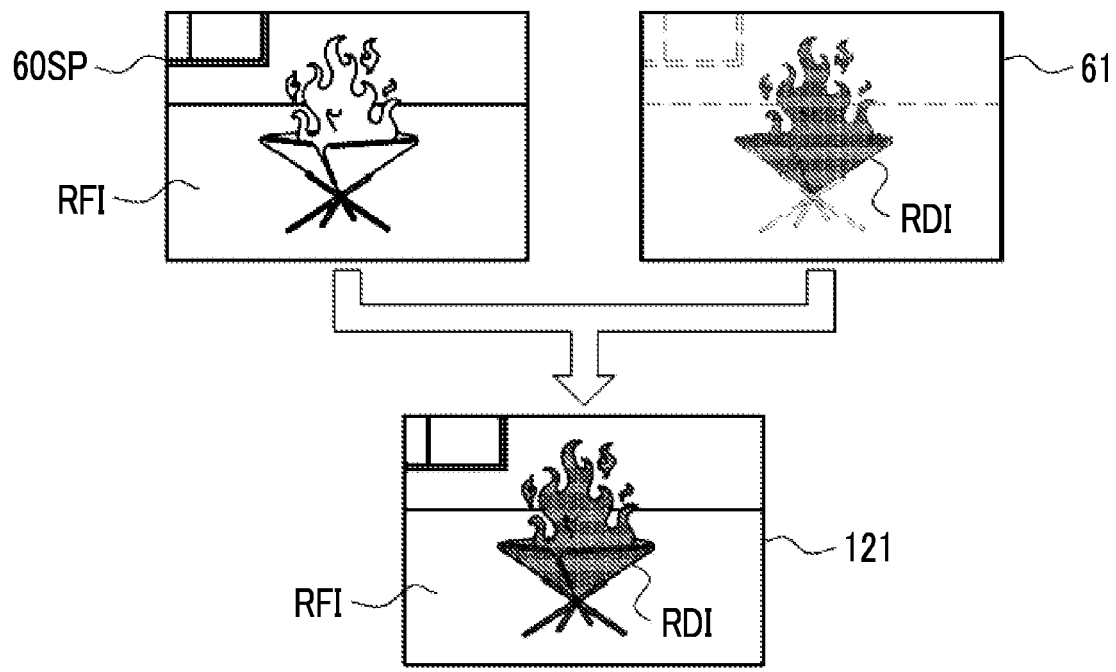
FIG. 15 is a diagram showing a state in which a superimposed image of a first image for superimposition and a second image is generated.

As shown in FIG. 14 as an example, in a case where the difference image 115 or the like is transferred from the transfer control unit 82, in the monitor device 50, a superimposed image 120 of the first image 60 and the difference image 115 is generated and the superimposed image 120 is presented to the user by being displayed on a display (not shown). The superimposed image 120 may be generated by the image processing unit 81 and transferred to the monitor device 50 by the transfer control unit 82. On the other hand, as shown in FIG. 15 as an example, in a case where the first image for superimposition 60SP or the like is transferred from the transfer control unit 82 instead of the difference image 115, in the monitor device 50, a superimposed image 121 of the first image for superimposition 60SP and the second image 61 is generated and the superimposed image 121 is presented to the user by being displayed on the display. In a case where the superimposed image 120 is generated, edge extraction may be performed on the first image 60 and the difference image 115, and the superimposition may be performed such that edges of the first image 60 and the difference image 115 may be aligned with each other. The same applies to the case where the superimposed image 121 is generated. Further, a region of the radiation image RDI of the superimposed images 120 and 121 may be displayed blinking or colored. Furthermore, an edge-extracted image of the reflected image RFI of the first image 60 or the first image for superimposition 60SP may be superimposed with the difference image 115 or the second image 61.

Figure 16:
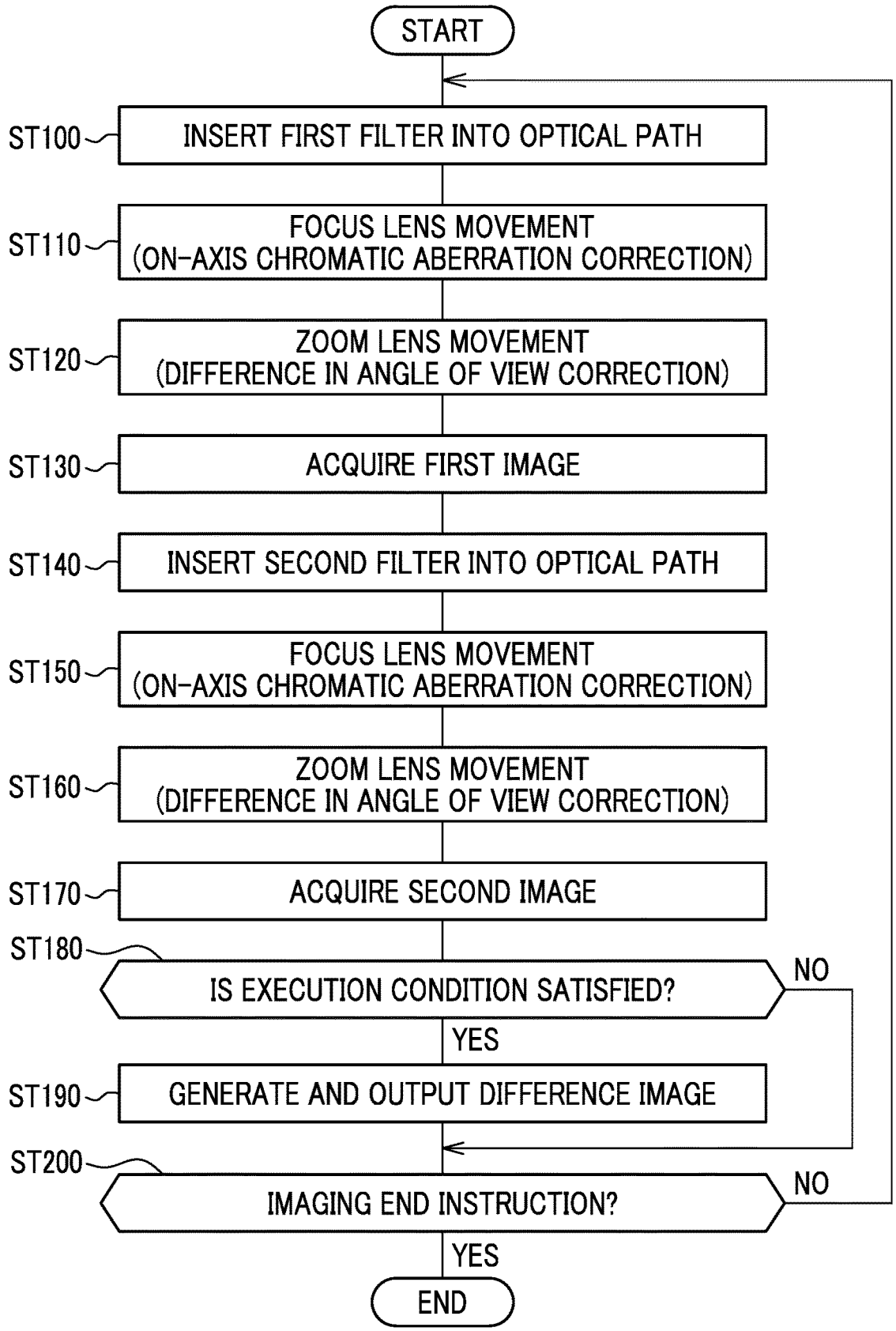
FIG. 16 is a flowchart showing an operation procedure of the control unit.

Next, an action of the above configuration will be described with reference to a flowchart of FIG. 16. The subject light SL is transmitted through the objective lens 25, the focus lens 26, the zoom lens 27, the stop 30, any of the filters F1 or F2 of the filter unit 31, and the master lens 28 of the imaging optical system 20 and reaches the light-receiving surface of the image sensor 21. The image sensor 21 images the subject light SL and outputs the image thereof under the control of the control unit 45.

The filter unit 31 is rotated clockwise by the filter unit driving mechanism 38 that is driven under the control of the filter unit driving control unit 86. Accordingly, the filters F1 and F2 are sequentially inserted into the optical path every one frame.

First, the first filter F1 is inserted into the optical path (step ST100). In this case, as shown in (A) of FIG. 5, the focus lens driving mechanism 35 that is driven under the control of the focus lens driving control unit 83 moves the focus lens 26 to the object-side direction OD. Accordingly, the on-axis chromatic aberration is corrected (step ST110). Further, the zoom lens driving mechanism 36 that is driven under the control of the zoom lens driving control unit 84 moves the zoom lens 27 to the object-side direction OD. Accordingly, the difference in angle of view is corrected (step ST120). As shown in FIG. 8, the movement of the zoom lens 27 for correcting the difference in angle of view and the movement of the focus lens 26 for focusing are actually repeated until the difference in angle of view is within the allowable range.

Under the control of the image sensor driving control unit 80, the visible ray VR transmitted through the first filter F1 is imaged by the image sensor 21, and the first image 60 including the reflected image RFI is output from the image sensor 21. The first image 60 is transmitted from the image sensor 21 to the image acquisition unit 100 of the image processing unit 81 and acquired by the image acquisition unit 100 (step ST130).

Subsequently, the second filter F2 is inserted into the optical path (step ST140). In this case, as shown in (B) of FIG. 5, the focus lens driving mechanism 35 that is driven under the control of the focus lens driving control unit 83 moves the focus lens 26 to the image-forming-side direction ID. Accordingly, the on-axis chromatic aberration is corrected (step ST150). Further, the zoom lens driving mechanism 36 that is driven under the control of the zoom lens driving control unit 84 moves the zoom lens 27 to the image-forming-side direction ID. Accordingly, the difference in angle of view is corrected (step ST160).

Under the control of the image sensor driving control unit 80, the infrared ray IR transmitted through the second filter F2 is imaged by the image sensor 21, and the second image 61 including the reflected image RFI and the radiation image RDI is output from the image sensor 21. The second image 61 is transmitted from the image sensor 21 to the image acquisition unit 100 of the image processing unit 81 and acquired by the image acquisition unit 100 (step ST170).

As shown in FIG. 9, the first image 60 is output from the image acquisition unit 100 to the brightness level calculation unit 101. The brightness level calculation unit 101 calculates the first brightness level 110 of the first image 60. The first brightness level 110 is output to the executability determination unit 102, and is compared with the threshold value TH in the executability determination unit 102.

As shown in FIG. 10, in the case where the first brightness level 110 is equal to or larger than the threshold value TH, the determination result 112A of "execute" is output from the executability determination unit 102 to the brightness level normalization unit 103, the difference image generation unit 104, and the image output unit 105 (YES in step ST180). In this case, the first image 60 becomes the normalized first image 60N in the brightness level normalization unit 103. The difference image generation unit 104 generates the difference image 115 between the normalized first image 60N and the second image 61. The difference image 115 is output from the image output unit 105 to the transfer control unit 82 together with the first image 60 and the second image 61 (step ST190).

On the other hand, as shown in FIG. 11, in the case where the first brightness level 110 is less than the threshold value TH, the determination result 112B of "not executed" is output from the executability determination unit 102 to the brightness level normalization unit 103, the difference image generation unit 104, and the image output unit 105 (NO in step ST180). In this case, the brightness level normalization unit 103 and the difference image generation unit 104 are not operated, and thus the difference image 115 is not generated.

The image output unit 105 outputs the first image for superimposition 60SP and the second image 61 to the transfer control unit 82. The series of pieces of processing of steps ST100 to ST190 are repeatedly continued until an imaging end instruction is input via the monitor device 50.

As described above, the filter unit driving control unit 86 of the CPU 65 selectively inserts the first filter F1 that transmits the visible ray VR and the second filter F2 that transmits the infrared ray IR into the optical path. The focus lens driving control unit 83 moves the focus lens 26 along the optical axis OA to correct the on-axis chromatic aberration between the visible ray VR transmitted through the first filter F1 and the infrared ray IR transmitted through the second filter F2. The image sensor driving control unit 80 causes the image sensor 21 to image the visible ray VR transmitted through the first filter F1 to acquire the first image 60 including the reflected image RFI of the subject. Further, the image sensor driving control unit 80 causes the image sensor 21 to image the infrared ray IR transmitted through the second filter F2 to acquire the second image 61 including the reflected image RFI and the radiation image RDI of the subject. The zoom lens driving control unit 84 moves the zoom lens 27 along the optical axis OA to correct the difference in angle of view between the first image 60 and the second image 61 caused by the movement of the focus lens 26 along the optical axis OA. The image processing unit 81 outputs the difference image 115 as the third image based on the first image 60 and the second image 61 acquired in the state in which the difference in angle of view is corrected. Thus, for example, as shown in FIG. 14, the superimposed image 120 of the first image 60 and the difference image 115 can be presented to the user. Therefore, the radiation image RDI can be presented to the user in an easy-to-understand manner as compared with a case where the reflected image RFI that hinders the observation of the radiation image RDI is not removed.

As shown in FIGS. 10 and 11, the image processing unit 81 outputs the difference image 115 only in a case where a preset execution condition is satisfied. The execution condition includes a content that the first brightness level 110, which is the brightness level of the reflected image RFI included in the first image 60, is equal to or larger than a preset threshold value TH. Thus, in a case where the radiation image RDI can be sufficiently observed without removing the reflected image RFI, such as at night, it is possible to save the trouble of generating and outputting the difference image 115. In other words, the difference image 115 can be generated and output only as needed. Even at night, in a case where the illumination light is emitted and the first brightness level 110 is equal to or larger than the threshold value TH, the difference image 115 is generated and output.

As shown in FIG. 11, in the case where the first brightness level 110 is less than the threshold value TH, the image processing unit 81 outputs the first image for superimposition 60SP acquired and stored in advance in the case where the first brightness level 110 is equal to or larger than the threshold value TH and the second image 61 acquired in the state in which the difference in angle of view is corrected. Thus, for example, as shown in FIG. 15, the superimposed image 121 of the first image for superimposition 60SP and the second image 61 can be presented to the user. Therefore, even in a case where it is difficult to visually recognize the reflected image RFI, such as at night, it is possible to grasp which portion of the subject has a high temperature and the like.

As shown in FIGS. 12 and 13, the image processing unit 81 matches the first brightness level 110 of the reflected image RFI included in the first image 60 with the second brightness level 111 of the reflected image RFI included in the second image 61 and then generates the difference image 115. Thus, it is possible to remove most of the reflected image RFI included in the second image 61 and to observe the radiation image RDI without being disturbed by the reflected image RFI.

As shown in FIG. 6, the zoom lens driving control unit 84 changes the movement amount of the zoom lens 27 required for correcting the difference in angle of view according to the position of the zoom lens 27 in a case where the on-axis chromatic aberration is corrected. Thus, it is possible to appropriately correct the difference in angle of view according to the position of the zoom lens 27.

As shown in FIG. 8, the focus lens driving control unit 83 moves the focus lens 26 to adjust the focus deviated by moving the zoom lens 27 in a case where the difference in angle of view is corrected. Thus, it is possible to acquire the first image 60 in which the difference in angle of view is corrected and the focus is on.

The imaging optical system 20 may include another optical element such as a half mirror or a polarizer. Further, the filter unit 31 is not limited to being disposed between the stop 30 and the master lens 28 and may be disposed, for example, between the zoom lens 27 and the stop 30, or at a rear stage of the master lens 28. Furthermore, the filter unit 31 may be disposed at a front stage of the image sensor 21 of the main body 12, instead of the lens barrel 11.

The camera 10 to which the lens barrel 11 and the main body 12 are detachable has been illustrated, but the present invention is not limited thereto. A camera in which the lens barrel 11 and the main body 12 are not detachable and are integrated may be employed.

The filter unit 31 may include a filter for optical path length adjustment or a dimming filter, in addition to the first filter F1 and the second filter F2. Further, the wavelength range of the visible ray VR transmitted through the first filter F1 is not limited to the illustrated 400 nm to 770 nm. The wavelength range of the infrared ray IR transmitted through the second filter F2 is also not limited to the illustrated 1450 nm to 1650 nm.

Second Embodiment

In the first embodiment, the execution condition is that the first brightness level 110 is equal to or larger than the threshold value TH, but is not limited thereto.

Figure 17:
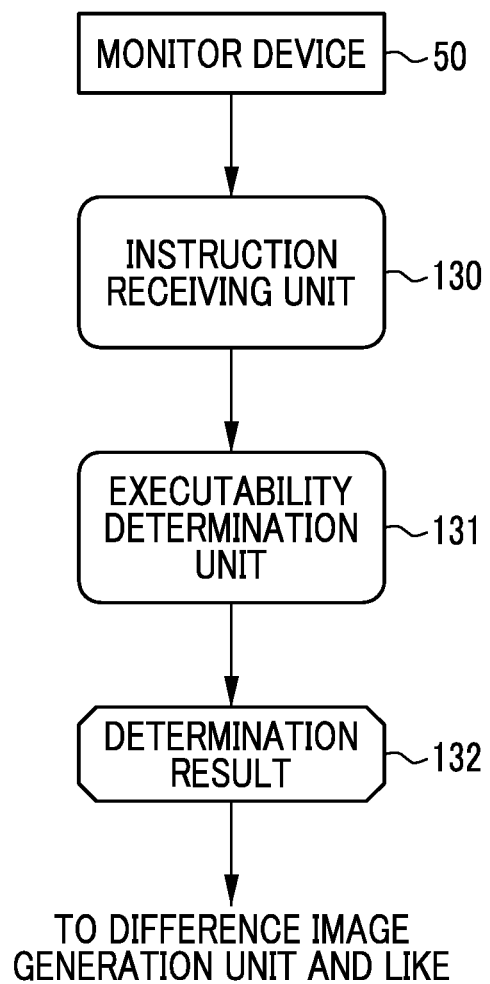
FIG. 17 is a diagram showing a control unit of a second embodiment.

As shown in FIG. 17 as an example, a CPU of a second embodiment functions as an instruction receiving unit 130 in addition to each unit of the first embodiment. The instruction receiving unit 130 receives an instruction input by the user via the monitor device 50. The instruction includes an instruction to execute the output of the difference image 115 (hereinafter referred to as execution instruction) and an instruction to cancel the execution instruction (hereinafter referred to as cancellation instruction). In a case where the execution instruction has been received, the instruction receiving unit 130 outputs to the executability determination unit 131 that the execution instruction has been received. Further, in a case where the cancellation instruction has been received, the instruction receiving unit 130 also outputs to the executability determination unit 131 that the cancellation instruction has been received. The executability determination unit 131 outputs a determination result 132 of the executability of the processing of outputting the difference image 115 between the first image 60 and the second image 61 to the brightness level normalization unit 103, the difference image generation unit 104, and the image output unit 105, which are not shown.

Figure 18:
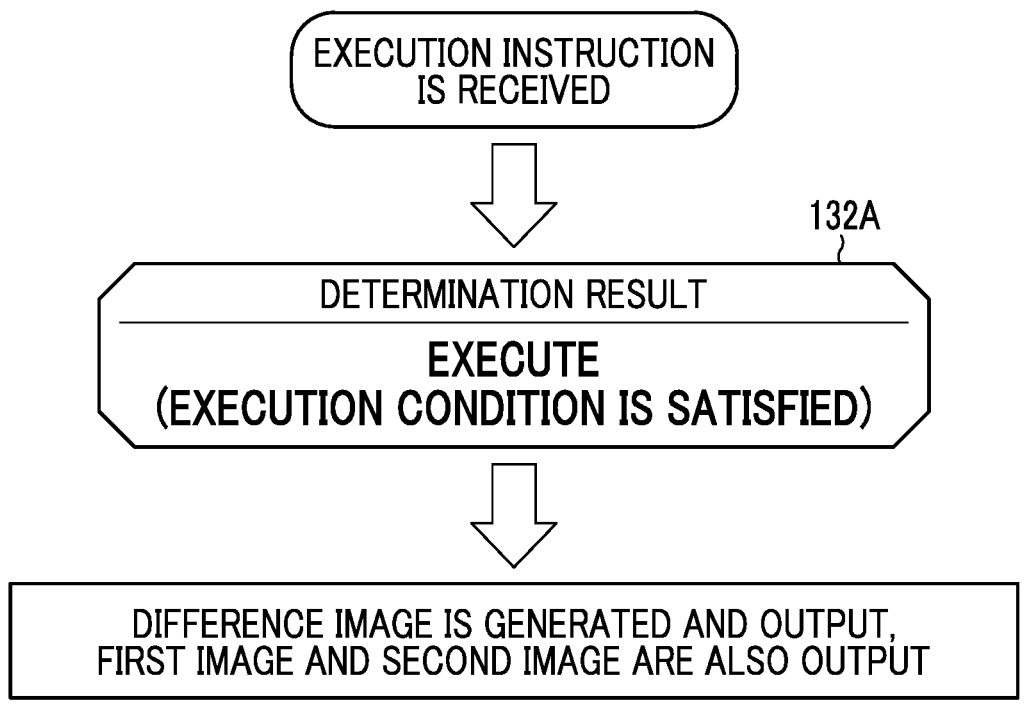
FIG. 18 is a diagram showing a determination result in a case where an execution instruction is received.
Figure 19:
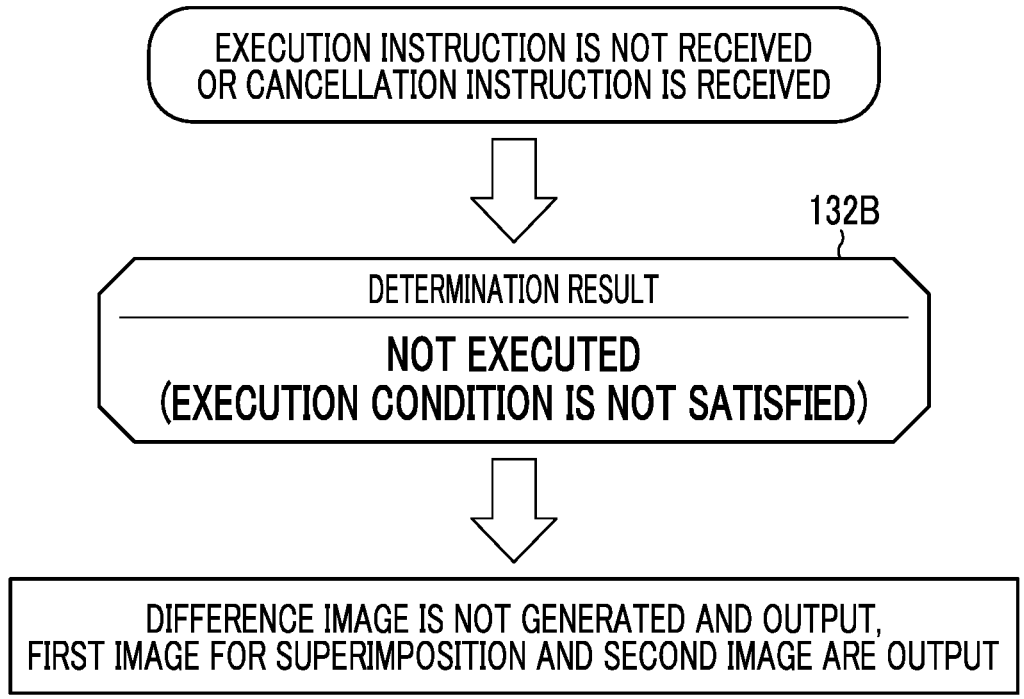
FIG. 19 is a diagram showing a determination result in a case where the execution instruction is not received or a cancellation instruction is received.

As shown in FIG. 18 as an example, in a case where the instruction receiving unit 130 receives the execution instruction, the executability determination unit 131 determines that the execution condition is satisfied and outputs a determination result 132A of "execute". On the contrary, as shown in FIG. 19 as an example, in a case where the instruction receiving unit 130 does not receive the execution instruction or the instruction receiving unit 130 receives the cancellation instruction, the executability determination unit 131 determines that the execution condition is not satisfied and outputs a determination result 132B of "not executed".

As described above, in the second embodiment, the execution condition includes a content that the instruction to execute the output of the difference image 115 has been received. Thus, it is possible to decide the executability of the processing of outputting the difference image 115 according to the intention of the user.

A configuration may be employed in which the aspect of the first embodiment that the execution condition is that the first brightness level 110 is equal to or larger than the threshold value TH and the aspect of the second embodiment that the execution condition is that the instruction to execute the output of the difference image 115 has been received is selectable by the user. This configuration also includes a case of selecting both aspects of the aspect of the first embodiment that the execution condition is that the first brightness level 110 is equal to or larger than the threshold value TH and the aspect of the second embodiment that the execution condition is that the instruction to execute the output of the difference image 115 has been received. In a case where both the aspect of the first embodiment and the aspect of the second embodiment are selected, the executability determination unit 131 determines that the execution condition is satisfied in the case where the first brightness level 110 is equal to or larger than the threshold value TH and in the case where the instruction to execute the output of the difference image 115 has been received.

Third Embodiment

In the first embodiment described above, the first brightness level 110 and the second brightness level 111 are matched and then the difference image 115 is generated, but the present invention is not limited thereto.

Figure 20:
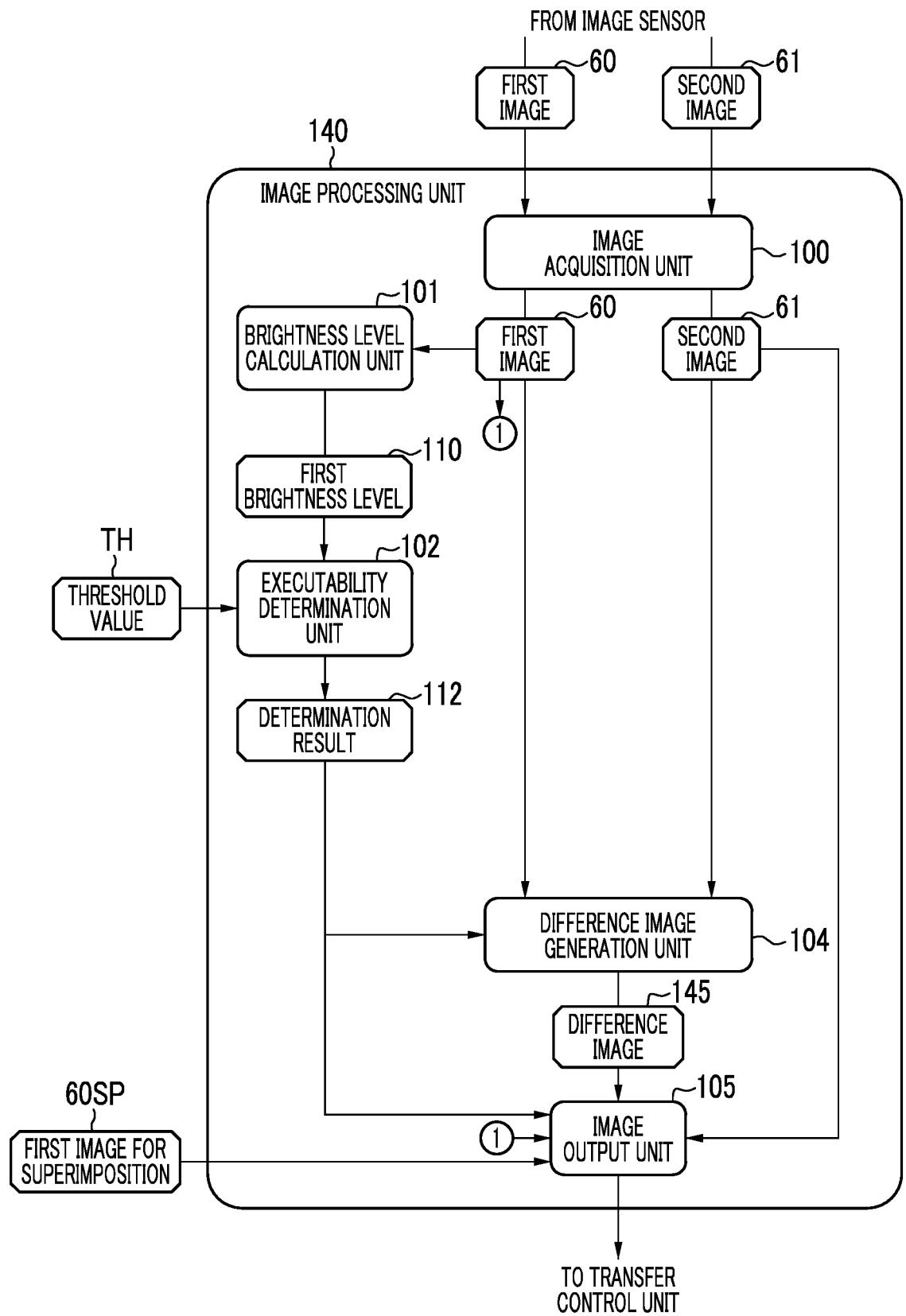
FIG. 20 is a block diagram showing details of an image processing unit of a third embodiment.

As shown in FIG. 20 as an example, an image processing unit 140 of a third embodiment is different from the image processing unit 81 of the first embodiment in that the brightness level normalization unit 103 is not provided. Further, there are differences in that the image acquisition unit 100 outputs only the first image 60 to the brightness level calculation unit 101 and the brightness level calculation unit 101 calculates only the first brightness level 110.

The image acquisition unit 100 directly outputs the first image 60 and the second image 61 to the difference image generation unit 104. The difference image generation unit 104 generates a difference image 145 of the first image 60 and the second image 61 and outputs the generated difference image 145 to the image output unit 105.

Figure 21:
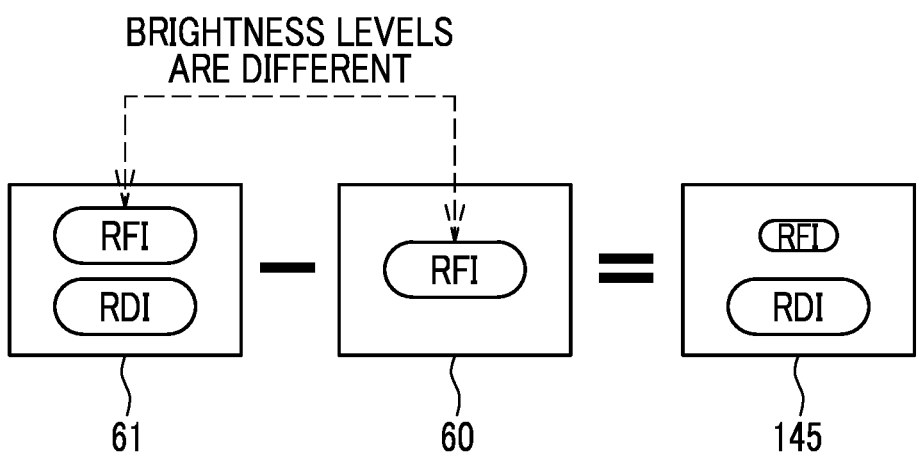
FIG. 21 is a diagram showing formation of a difference image of a third embodiment.

In FIG. 21 showing formation of the difference image 145, the difference image generation unit 104 subtracts the first image 60 from the second image 61 to generate the difference image 145. The second brightness level 111 of the reflected image RFI included in the second image 61 is different from the first brightness level 110 of the reflected image RFI included in the first image 60 since the first brightness level 110 is not normalized as in the first embodiment. Thus, the difference image 145 is an image in which the reflected image RFI of the second image 61 remains to some extent as compared with the difference image 115 of the first embodiment.

Figure 22:
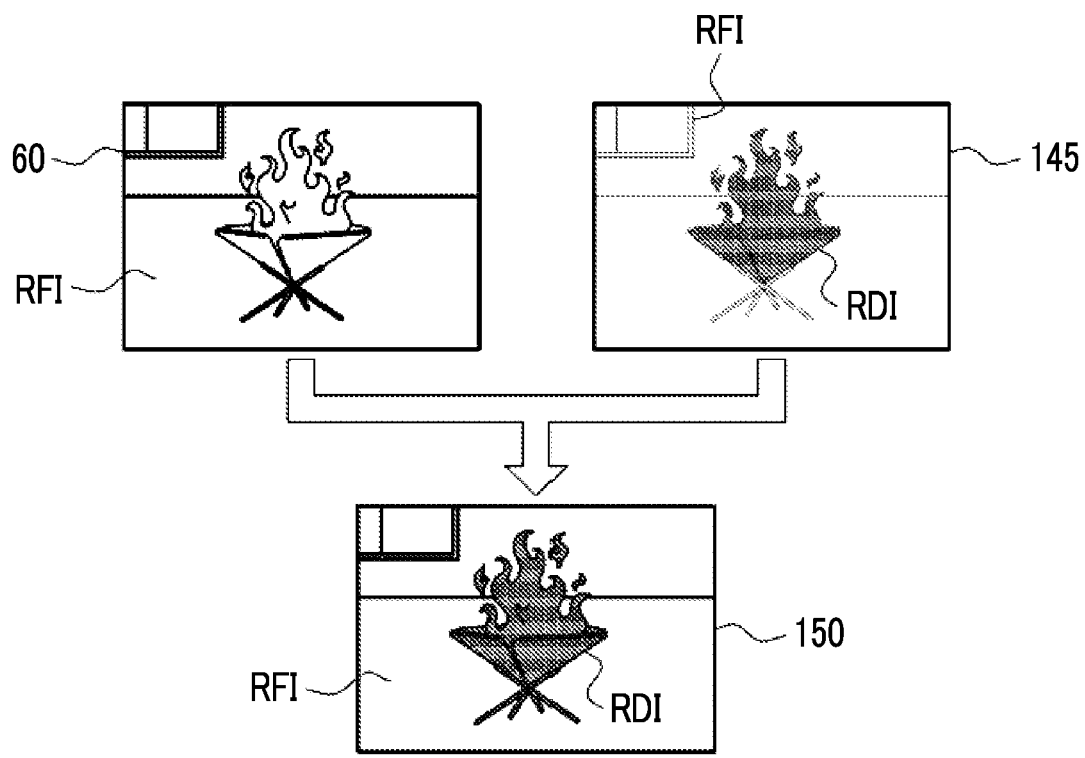
FIG. 22 is a diagram showing a state in which a superimposed image of a first image and a difference image is generated.

As described above, in the third embodiment, the difference image 145 is generated without matching the first brightness level 110 of the reflected image RFI included in the first image 60 with the second brightness level 111 of the reflected image RFI included in the second image 61. Thus, as shown in FIG. 22 as an example, in a case where the monitor device 50 generates a superimposed image 150 of the first image 60 and the difference image 145, registration between the first image 60 and the difference image 145 can be performed with high accuracy due to the reflected image RFI remaining in the difference image 145.

Fourth Embodiment

Figure 23:
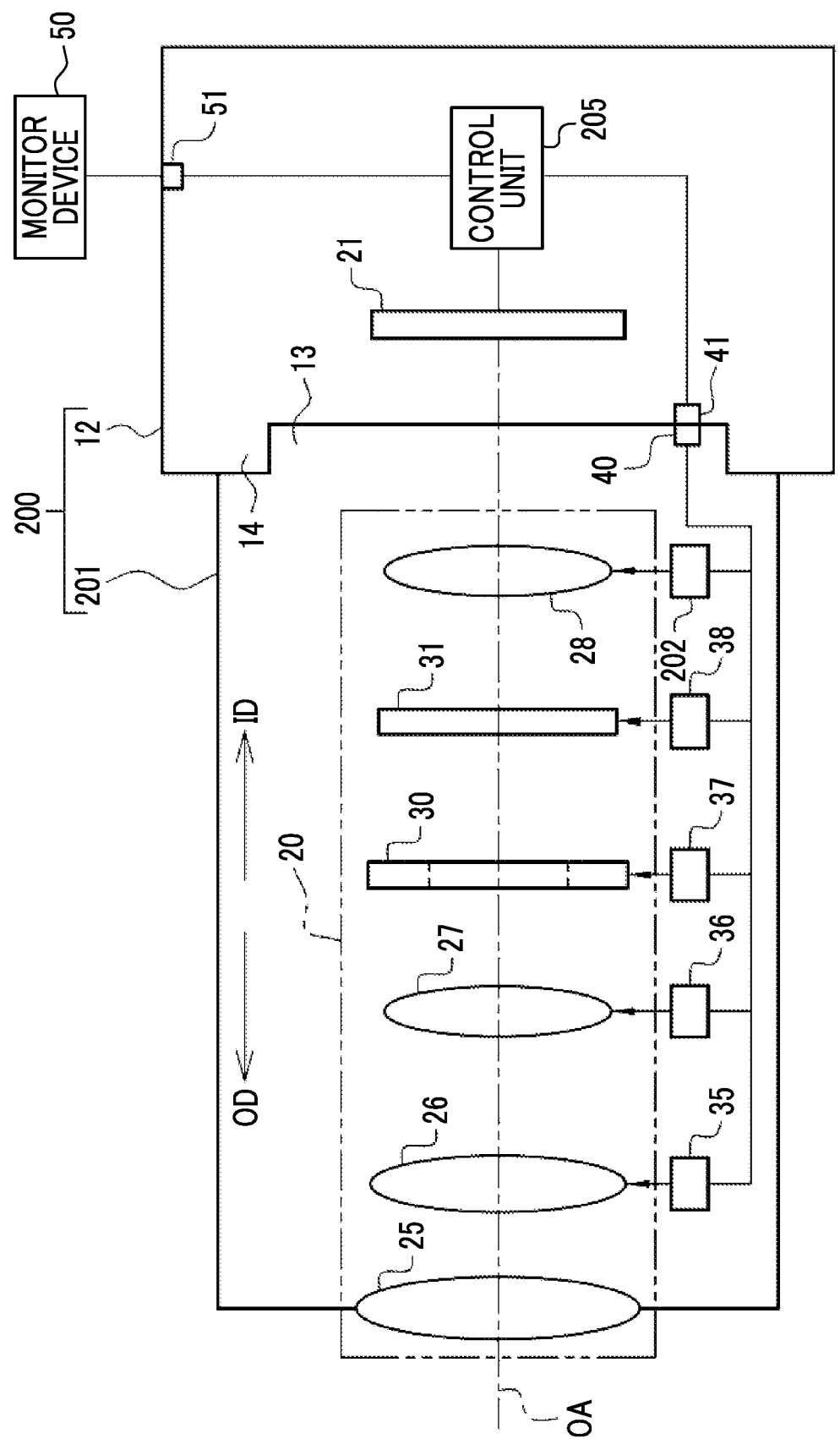
FIG. 23 is a diagram showing a camera of a fourth embodiment.

In a fourth embodiment shown in FIGS. 23 and 24, the master lens 28 is used to correct the on-axis chromatic aberration in addition to the focus lens 26.

In FIG. 23, the camera 200 of the fourth embodiment comprises a lens barrel 201 and the main body 12. The lens barrel 201 has substantially the same configuration as the lens barrel 11 of the first embodiment, except that a master lens driving mechanism 202 is connected to the master lens 28. In addition, the same reference numeral is assigned to the same part as in the first embodiment, and the description thereof will be omitted.

Similar to the focus lens driving mechanism 35 and the zoom lens driving mechanism 36, the master lens driving mechanism 202 holds the master lens 28 and includes a cam ring for master in which a cam groove is formed on the outer periphery thereof, a motor for master that rotates the cam ring for master around the optical axis OA to move the cam ring for master along the optical axis OA, and the like. The motor for master is driven under the control of the control unit 205. The motor for master is a stepping motor, and the control unit 205 derives a position of the master lens 28 on the optical axis OA from a drive amount of the motor for master.

The control unit 205 moves the focus lens 26 along the optical axis OA via the focus lens driving mechanism 35 to correct the on-axis chromatic aberration of a plurality of types of light each transmitted through the filters F1 and F2. Further, the control unit 205 moves the master lens 28 along the optical axis OA via the master lens driving mechanism 202 to correct the on-axis chromatic aberration of the plurality of types of light each transmitted through the filters F1 and F2. That is, in the fourth embodiment, the master lens 28 in addition to the focus lens 26 is also an example of the "correction lens" according to the technique of the present disclosure.

As an example, as shown in a flowchart of FIG. 24, the control unit 205 first detects the position of the zoom lens 27 (step ST500). In a case where the detected position of the zoom lens 27 is on the telephoto side with respect to a preset threshold value, that is, in a case where the zoom lens 27 is located closer to the telephoto side than the preset threshold value (YES in step ST510), the control unit 205 moves the focus lens 26 along the optical axis OA via the focus lens driving mechanism 35 to correct the on-axis chromatic aberration (step ST520). On the contrary, in a case where the detected position of the zoom lens 27 is on a wide angle side with respect to the threshold value, that is, in a case where the zoom lens 27 is located closer to the wide angle side than the threshold value (NO in step ST510), the control unit 205 moves the master lens 28 along the optical axis OA via the master lens driving mechanism 202 to correct the on-axis chromatic aberration (step ST530).

As described above, in the fourth embodiment, the focus lens 26 is moved to correct the on-axis chromatic aberration in the case where the zoom lens 27 is located closer to the telephoto side than the preset threshold value, and the master lens 28 is moved to correct the on-axis chromatic aberration in the case where the zoom lens 27 is located closer to the wide angle side than the preset threshold value. In the case where the zoom lens 27 is located on the telephoto side, the movement amount required for correcting the on-axis chromatic aberration is smaller in the focus lens 26 than in the master lens 28. Thus, in the case where the zoom lens 27 is located closer to the telephoto side than the preset threshold value, a time required for correcting the on-axis chromatic aberration can be shortened by the movement of the focus lens 26. On the other hand, in the case where the zoom lens 27 is located on the wide angle side, the movement amount required for correcting the on-axis chromatic aberration is smaller in the master lens 28 than in the focus lens 26. Thus, in the case where the zoom lens 27 is located closer to the wide angle side than the preset threshold value, the time required for correcting the on-axis chromatic aberration can be shortened by the movement of the master lens 28. The on-axis chromatic aberration may be corrected by movement of the focus lens 26 and the master lens 28 in parallel.

In each of the above embodiments, the difference images 115 and 145 are illustrated as the third image, but the present invention is not limited thereto.

The zoom function is not limited to the illustrated optical zoom function 90. An electronic zoom function may be used in addition to or instead of the optical zoom function 90. Further, the first image for superimposition 60SP may be transferred to the monitor device 50 every one frame, or may be transferred to the monitor device 50 only once. In the case of transferring only once, the first image for superimposition 60SP is stored in the monitor device 50 and reused.

In each of the above embodiments, the cameras 10 and 200, which are surveillance cameras installed in a factory or the like, are shown as an example of the "imaging device" according to the technique of the present disclosure, but the present invention is not limited thereto. A digital camera used by a general user, a smart device, or the like may be used instead of the cameras 10 and 200.

In each of the above embodiments, the aspects have been illustrated in which the control units 45 and 205 corresponding to the imaging control devices of the present disclosure are mounted on the cameras 10 and 200, but the present invention is not limited thereto. The imaging control device of the present disclosure may be mounted on the monitor device 50.

In each of the above embodiments, for example, as a hardware structure of the processing units executing various types of processing such as the image sensor driving control unit 80, the image processing units 81 and 140, the transfer control unit 82, the focus lens driving control unit 83, the zoom lens driving control unit 84, the stop driving control unit 85, and the filter unit driving control unit 86, the image acquisition unit 100, the brightness level calculation unit 101, the executability determination units 102 and 131, the brightness level normalization unit 103, the difference image generation unit 104, the image output unit 105, and the instruction receiving unit 130, various processors shown below can be used. The various processors include a programmable logic device (PLD) which is a processor whose circuit configuration is changeable after manufacturing such as a field programmable gate array (FPGA), a dedicated electric circuit which is a processor having a circuit configuration exclusively designed to execute specific processing such as an application specific integrated circuit (ASIC), and the like, in addition to the CPU 65 which is a general-purpose processor that executes software (operation program 70) to function as various processing units, as described above.

One processing unit may be configured by one of the various types of processors or may be configured by a combination of two or more processors of the same type or different types (for example, a combination of a plurality of FPGAs and/or a combination of a CPU and an FPGA). The plurality of processing units may be configured of one processor.

As an example of configuring the plurality of processing units with one processor, first, there is a form in which one processor is configured by a combination of one or more CPUs and software and the processor functions as the plurality of processing units, as represented by computers such as a client and a server. Second, there is a form in which a processor that realizes the functions of the entire system including the plurality of processing units with one integrated circuit (IC) chip is used, as represented by a system-on-chip (SoC) or the like. As described above, the various processing units are configured using one or more of the various processors as the hardware structure.

More specifically, a circuitry combining circuit elements such as semiconductor elements may be used as the hardware structure of the various processors.

The above various embodiments and/or various modification examples can be combined as appropriate in the technique of the present disclosure. It is needless to say that the technique of the present disclosure is not limited to each of the above embodiments and various configurations can be employed without departing from the gist. Further, the technique of the present disclosure extends to a storage medium that stores the program non-transitorily, in addition to the program.

The description content and the illustrated content described above are detailed descriptions of portions according to the technique of the present disclosure and are merely an example of the technique of the present disclosure. For example, the above description of the configurations, functions, actions, and effects is an example of the configurations, functions, actions, and effects of the portions according to the technique of the present disclosure. Therefore, it is needless to say that an unnecessary part may be deleted, a new element may be added, or a replacement may be performed to the description content and the illustrated content described above within a scope not departing from the gist of the technique of the present disclosure. In order to avoid complication and facilitate understanding of the portion according to the technique of the present disclosure, the description related to common general knowledge not requiring special description in order to implement the technique of the present disclosure is omitted in the above description content and illustrated content.

In the present specification, "A and/or B" is synonymous with "at least one of A or B". That is, "A and/or B" means that only A may be used, only B may be used, or a combination of A and B may be used. In the present specification, the same concept as "A and/or B" is also applied to a case where three or more matters are linked and expressed by "and/or".

All documents, patent applications, and technical standards described in the present specification are incorporated by reference in the present specification to the same extent as in a case where the incorporation of each individual document, patent application, and technical standard by reference is specifically and individually described.

What is claimed is:

1. An imaging controller comprising:
a processor; and
a memory connected to or built into the processor,
wherein the imaging controller controls an operation of a camera having a first filter, a second filter, a correction lens, a zoom function, and an image sensor,
the first filter is configured to transmit a visible ray,
the second filter is configured to transmit an infrared ray, and
the processor is configured to:
selectively insert the first filter and the second filter into an optical path;
move the correction lens along an optical axis to correct an on-axis chromatic aberration between the visible ray transmitted through the first filter and the infrared rays transmitted through the second filter;
cause the image sensor to image the visible ray transmitted through the first filter to acquire a first image including a reflected image of a subject;
cause the image sensor to image the infrared ray transmitted through the second filter to acquire a second image including the reflected image and a radiation image of the subject;
operate the zoom function to correct a difference in angle of view between the first image and the second image caused by the movement of the correction lens along the optical axis; and
output a third image including the radiation image based on the first image and the second image acquired in a state in which the difference in angle of view is corrected,
wherein the processor is configured to output the third image only in a case where a preset execution condition is satisfied, and the execution condition includes a content that a brightness level of the reflected image included in the first image is equal to or larger than a preset threshold value.

2. The imaging controller according to claim 1,
wherein the processor is configured to:
in a case where the brightness level is less than the threshold value, output the first image acquired and stored in advance in a case where the brightness level is equal to or larger than the threshold value and the second image acquired in a state in which the difference in angle of view is corrected.

3. The imaging controller according to claim 1,
wherein the execution condition includes a content that an instruction to execute the output of the third image is received.

4. The imaging controller according to claim 1,
wherein the processor is configured to:
generate a difference image between the first image and the second image as the third image.

5. The imaging controller according to claim 4,
wherein the processor is configured to:
match a brightness level of the reflected image included in the first image with a brightness level of the reflected image included in the second image and then generate the difference image.

6. The imaging controller according to claim 4, wherein the processor is configured to:
generate the difference image in a state in which a brightness level of the reflected image included in the first image is different from a brightness level of the reflected image included in the second image.

7. The imaging controller according to claim 1, wherein the camera has a zoom lens, and
the processor is configured to move the zoom lens along the optical axis to correct the difference in angle of view between the first image and the second image caused by the movement of the correction lens along the optical axis.

8. The imaging controller according to claim 7, wherein the processor is configured to:
change a movement amount of the zoom lens required for the correction of the difference in angle of view according to a position of the zoom lens in a case where the on-axis chromatic aberration is corrected.

9. The imaging controller according to claim 7, wherein the processor is configured to:
move the correction lens to adjust a focus deviated by the movement of the zoom lens in a case where the difference in angle of view is corrected.

10. A camera comprising:
the imaging controller according to claim 1.

11. An operation method of an imaging controller that controls an operation of a camera having a first filter that transmits a visible ray, a second filter that transmits an infrared ray, a correction lens, a zoom function, and an image sensor, the operation method comprising:
by a processor of the imaging controller,
selectively inserting the first filter and the second filter into an optical path;
moving the correction lens along an optical axis to correct an on-axis chromatic aberration between the visible ray transmitted through the first filter and the infrared rays transmitted through the second filter;
causing the image sensor to image the visible ray transmitted through the first filter to acquire a first image including a reflected image of a subject;
causing the image sensor to image the infrared ray transmitted through the second filter to acquire a second image including the reflected image and a radiation image of the subject;
operating the zoom function to correct a difference in angle of view between the first image and the second image caused by the movement of the correction lens along the optical axis; and
outputting a third image including the radiation image based on the first image and the second image acquired in a state in which the difference in angle of view is corrected,
wherein the processor is configured to output the third image only in a case where a preset execution condition is satisfied, and the execution condition includes a content that a brightness level of the reflected image included in the first image is equal to or larger than a preset threshold value.

12. A non-transitory storage medium storing a program that controls an operation of a camera having a first filter that transmits a visible ray, a second filter that transmits an infrared ray, a correction lens, a zoom function, and an image sensor, the program causing a computer to execute a process comprising:
selectively inserting the first filter and the second filter into an optical path;
moving the correction lens along an optical axis to correct an on-axis chromatic aberration between the visible ray transmitted through the first filter and the infrared rays transmitted through the second filter;
causing the image sensor to image the visible ray transmitted through the first filter to acquire a first image including a reflected image of a subject;
causing the image sensor to image the infrared ray transmitted through the second filter to acquire a second image including the reflected image and a radiation image of the subject;
operating the zoom function to correct a difference in angle of view between the first image and the second image caused by the movement of the correction lens along the optical axis; and
outputting a third image including the radiation image based on the first image and the second image acquired in a state in which the difference in angle of view is corrected,
wherein the computer is configured to output the third image only in a case where a preset execution condition is satisfied, and the execution condition includes a content that a brightness level of the reflected image included in the first image is equal to or larger than a preset threshold value.

* * * * *